(12) United States Patent
Burchard et al.

(10) Patent No.: US 11,057,396 B2
(45) Date of Patent: Jul. 6, 2021

(54) INTELLIGENT TRANSPORTATION SYSTEM STATION, HOST PROCESSOR, AND METHOD THEREFOR

(71) Applicant: NXP B.V., Eindhoven (NL)

(72) Inventors: Artur Burchard, Eindhoven (NL); Tomasz Szuprycinski, Nijmegen (NL)

(73) Assignee: NXP B.V., Eindhoven (NL)

( * ) Notice: Subject to any disclaimer, the term of this patent is extended or adjusted under 35 U.S.C. 154(b) by 517 days.

(21) Appl. No.: 15/906,437

(22) Filed: Feb. 27, 2018

(65) Prior Publication Data

US 2018/0288069 A1  Oct. 4, 2018

(30) Foreign Application Priority Data

Mar. 31, 2017  (EP) ..................................... 17164134

(51) Int. Cl.
*H04L 29/06* (2006.01)
*H04L 9/30* (2006.01)
*H04L 9/32* (2006.01)
*G09C 1/00* (2006.01)

(52) U.S. Cl.
CPC .............. *H04L 63/126* (2013.01); *G09C 1/00* (2013.01); *H04L 9/30* (2013.01); *H04L 9/3252* (2013.01); *H04L 9/3263* (2013.01); *H04L 63/0823* (2013.01); *H04L 63/123* (2013.01); *H04L 2209/84* (2013.01)

(58) Field of Classification Search
CPC ....... H04L 63/126; H04L 9/30; H04L 9/3252; H04L 9/3263; H04L 63/0823; H04L 63/123; H04L 2209/84; G09C 1/00
See application file for complete search history.

(56) References Cited

U.S. PATENT DOCUMENTS

| | | | |
|---|---|---|---|
| 8,345,864 B1* | 1/2013 | Robinson | H04L 9/3066 380/30 |
| 8,788,827 B2* | 7/2014 | Struik | H04L 9/3066 713/171 |
| 2011/0194694 A1 | 8/2011 | Struik | |
| 2011/0208971 A1* | 8/2011 | Bhattacharya | H04L 63/12 713/179 |
| 2013/0097420 A1 | 4/2013 | Zaverucha | |
| 2015/0188713 A1 | 7/2015 | Rombouts et al. | |

OTHER PUBLICATIONS

Antipa, A., "Accelerated Verification of ECDSA Signatures", International Workshop on Selected Areas in Crytpography, SAC 2005.
Knezevic, M., "Low-Latency ECDSA Signature Verification—A Road Towards Safer Traffic", International Association for Cryptologic Research, Oct. 2014.

* cited by examiner

*Primary Examiner* — Shin-Hon (Eric) Chen
*Assistant Examiner* — Jessica J South

(57) ABSTRACT

An intelligent transportation system, ITS, station (600) comprising: a host processor (640); and a memory (664) operably coupled to the host processor (640). The host processor (640) is configured to: perform verification per identity that includes precomputation of data for a plurality of neighbouring ITS stations of the ITS station (600); store precomputation data for the verified identity of the plurality of neighbouring ITS stations in the memory (664); and extract from memory (664) and use the stored precomputation data for a respective neighbouring ITS station to perform an accelerated verification of a subsequent message received from that neighbouring ITS station.

18 Claims, 14 Drawing Sheets

INTELLIGENT TRANSPORTATION SYSTEM STATION, HOST PROCESSOR, AND METHOD THEREFOR

CROSS-REFERENCE TO RELATED APPLICATIONS

This application claims the priority under 35 U.S.C. § 119 of European Patent application no. 17164134.3, filed on 31 Mar. 2017, the contents of which are incorporated by reference herein.

FIELD OF THE INVENTION

The field of the invention relates to an intelligent transportation system (ITS) station, a host processor, and a method therefor. The invention is applicable to, but not limited to, a mechanism to speed up Elliptic Curve Digital Signature Algorithm (ECDSA) verification (of messages and certificates) and other computations based on scalar EC point multiplications.

BACKGROUND OF THE INVENTION

It is known that road usage by vehicles continues to increase, year on year. Increased road usage causes many problems, such as increased congestion, longer travel time, higher travel costs, increased air pollution, increased accident risk, etc. In order to cope with this steady increase, solutions are required to better manage vehicle road usage. A possible solution is to construct new roads, which is unlikely to happen on a large enough scale. A further solution is to reduce traffic and/or provide alternative transportation options, neither of which is viable in most practical scenarios.

A further solution that is being widely researched and developed is the use of intelligent traffic (or transportation) systems (ITSs). ITS is being developed for a variety of applications, such as a stationary vehicle warning following an accident or vehicle problem, traffic condition warning (such as a traffic jam ahead warning), regulatory/contextual speed limits, road work warnings, detour notifications, etc. Some ITS solutions propose a communication back bone employing V2X communication (i.e. a vehicle-to-vehicle infrastructure). V2X is used for both a real time exchange of safety messages between participants to resolve potentially dangerous road situations, as well as to exchange essential information to improve traffic.

One known ITS station architecture 100 is shown in FIG. 1. ITS system 100 includes a wireless transceiver integrated circuit 108 that comprises wireless transmitter and a wireless receiver connected to an antenna 102. The receiver is arranged to receive ITS messages broadcast from other ITS stations. The transmitter is arranged to broadcast ITS messages to other ITS stations (e.g. local vehicles, roadside units etc.). The wireless transceiver integrated circuit 108 is coupled to a baseband (BB) circuit 130, which may be of the form of a digital signal processor (DSP) and comprise quadrature channel low pass filters (LPFs) and quadrature analog to digital converters ADCs. Communication between ITS stations may use the IEEE 802.11p communication protocol or other protocols, e.g. cellular.

The IEEE 802.11p is a standard for wireless access in vehicular environments (WAVE), namely enhancements to 802.11 required to support ITS applications. This includes data exchange between high-speed vehicles and between the vehicles and the roadside infrastructure in the licensed ITS band of 5.9 GHz (5.85-5.925 GHz). The IEEE 802.11p defines physical medium for communication and is common for different regions (mainly US, EU, Australia etc.). The higher layers differ for US and the European Union, and can be used with other physical mediums (e.g. LTE-direct or 5th Generation communications). The US standards are defined in IEEE 1609 family of standards for Wireless Access in Vehicular Environments (WAVE). The EU standards are defined by ETSI, with Communications Architecture described in ETSI EN 302 665.

The BB circuit 130 performs the processing up to a data link layer (physical (PHY) layer and part of the medium access control (MAC) layer). The system has a micro controller unit (MCU) 140 that is connected 138 to the BB circuit 130 that executes a protocol 1609 stack, and thus converts IEEE1609 messages into RF signals for broadcasting. The MCU 140 is also coupled to (or contains) a security circuit 150 that is used for signature generation for IEEE 1609.2 messages. ITS station architecture 100 is thereby able to receive and transmit 802.11p packets from and to other ITS stations.

FIG. 2 illustrates one known configuration of a V2X stack 220 that includes V2X security 228, using two chipsets, namely a V2X host processor 210 and a V2X baseband (BB) integrated circuit 240. In this known configuration, the V2X host processor 210 supports V2X applications 212 and the V2X stack 220 includes V2X facilities 222, V2X transport 224, V2X Geo-networking 226, the V2X security 228 and Link Layer processing 234. Elliptic Curve Digital Signature Algorithm (ECDSA) is used in V2X systems for authentication of messages exchanged between ITS stations to ensure trust in the system. The V2X security 228 includes hardware and/or a software ECDSA accelerator to perform signature generation 230 and signature verification 232 procedures. The BB 240 includes Link layer processing 242, Medium Access Control (MAC) layer processing 244 and a Physical Layer 246, for example performing RF tuning. It is known that other configurations of a V2X stack may be used.

ECDSA message signing 230 and ECDSA message verification 232 are both cryptographic operations and therefore mostly happen in a Hardware Security Module (HSM) of the host processor 210 or in a separate certified Secure Element (SE). ECDSA message signing 230 and ECDSA message verification 232 are very computationally intensive and therefore they should be accelerated by hardware or by a specialized software library on the host processor 210 or in the BB 240. Both ECDSA message signing 230 and ECDSA message verification 232 can happen in different places in a V2X system. In FIG. 2, the ECDSA message verification 232 is configured to communicate with public key storage memory 236 in host processor 210, as well as an ECDSA message verification hardware-software accelerator 248 located in BB 240.

The security in V2X communication is standardized for US in IEEE 1609.2, and in EU in ETSI TS 103 097. It is fundamental to prevent unwanted, wrong or misleading information causing impact on V2X communication participants. Security is predominantly used to ensure that messages are coming from trusted sources, were not altered during transmission, and therefore the information they carry can be trusted as well. The trust is built upon authentication of ITS stations and messages broadcasted by them. The authentication is realized using digital signatures based on public key cryptography. In secure V2X, the sender has private keys, as well as signed certificates, making up its identities. It uses private keys to sign messages, calculating additional information required to verify their authenticity (and integrity). The messages are broadcasted together with certificates related to used private keys. The verification of a message is done using public key included in the certificate. The certificates are similarly authenticated by certification authorities, making a certificate chain up to root certification authority. As long as the certificate of root certification authority is shared among participants, it is possible to verify the integrity and authenticity of the sender and its messages.

The security standards in both the US and the European Union enforce usage of Elliptic Curve Digital Signature Algorithm defined in IEEE Std. 1363a. The main reason for usage of Elliptic Curve cryptography is the required length of keys and signatures in order to achieve a sufficient level of security. The ECC requires 256 bits long keys and 512 bits long signatures.

ECDSA verification is based on scalar multiplication of two elliptic curve points by two scalar multipliers, these calculations are signature specific. When implemented in hardware or software the current verification algorithms provide a certain verification speed. The speed of verification is an important aspect, as it determines how many messages from surrounding vehicles (and/or other ITS stations) can be trusted. V2X standards define the number of messages that a vehicle shall broadcast. The number of messages depends on several factors, including: speed, acceleration, change of steering angle, congestion on the wireless channel etc. In normal circumstances, when stations transmit their status, the number fluctuates between 1 to 10 per second. In case of an emergency, the number can go up to 20 per second. The number of vehicles (e.g. the penetration rate) equipped with V2X technology will dictate requirements on the reception side. A low penetration rate at the beginning of deployment means that only a few messages will require verification, whilst with a substantial increase in the penetration rate, it is envisaged that the requirement may be as high as 1000 verifications per second for a single channel. The number is limited by 801.11p channel capacity.

Referring now to FIG. 3, a known flow diagram 232 of an ECDSA verification of a V2X signed message is illustrated. To verify a message, a ECDSA message verification 232 on a host processor 210 of a receiving station extracts signature (r 306 and s 304) information from the message and processes the message in order to obtain its hash 'e' 302. Next the ECDSA message verification 232 calculates scalar values $u_1$ and $u_2$ 312 from e 302, r 306 and s 304, following inversion of the determined signature s 304 and scalar multiplying 310. In the main step of the signature verification, two elliptic points (public key $P_A$ 318 and curve base point G 316) are multiplied by the scalars $u_1$ and $u_2$ 312 in scalar multipliers 320 in an ECC point multiplication circuit 314 and the two resulting points are added in an ECC point addition circuit 322. The signature P 324 of the message is then verified in 326 using the variable r 306. The signature verification has either failed 328 or succeeded 330. Parameters used in this known verification process are provided in Table 1.

TABLE 1

Elliptic Curve

Elliptic curve E: $y^2 = x^3 + ax + b \mod p$
G is a reference base point on the curve
p is prime number of the GF(p), TABLE 1-continued Keys $d_A$: private key of a Car, random number (the secret)
$P_A$: corresponding public key, $P_A = d_A * G$
"discrete log problem": given $P_A$ and G it is difficult to calculate $d_A$
Signature Generation Input
1. e: Hash of a messageM (e.g. SHA2)
2. k: Random number
Calculate signature (r, s)
1. P = k * G
2. r = $(k * G)_x = P_x$
3. s = $k^{-1} * (e + d_A * r)$
Signature Verification Input
e: Hash of a message (e.g. SHA2)
(r, s): signature received in a V2X message
$P_A$: public key received in a V2X certificate
Calculate
w = $s^{-1}$
$u_1$ = e * w
$u_2$ = r * w
P = $u_1 * G + u_2 * P_A$
Verification
$P_x$ = r ? Yes: Verification OK No: Verification Failed A majority of the verification computation complexity emanates from the calculation of scalar multiplications in equation [1]:

$$P = u_1 * G + u_2 * P_A \quad [1]$$

To calculate a single scalar point multiplication (e.g. P=$u_1$*G) we take a binary representation of scalar number (e.g. u1) and we walk through its bits from left (most significant bit to right (the least significant bit). For each bit when a u1[i] bit is equal to 1 we add the point (G) to the result (P) and we double the resulting value before we take the next bit. When a bit was zero we only double. We call this method left-to-right scalar multiplication.

In order to calculate two scalar point multiplications (e.g. $u_1$*G+$u_2$*$P_A$), i.e. a joint scalar multiplication (JSM) 500 as illustrated in FIG. 5, two left-to-right multiplications may be performed at twice the time of single point multiplication. However, this calculation may be performed much faster by performing a joint scalar multiplication (JSM). Here, the same left-to-right calculation is applied as for a single point multiplication, but now taking into account a pair of bits ($u_1$[i], $u_2$[i]). There are four actions possible based on the following four combinations, before taking the next pair of bits:

0,0: double the result;
   0,1: add point $P_A$ and double the result;
   1,0: add point G and double the result;
   1,1: add G and add $P_A$ and double the result.

Point additions and point doublings are operations defined for an Elliptic Curve. There are many approaches to point additions and doublings, and depending on chosen coordinates different amount of computation is needed for both of them.

As can be seen from the above scheme, for a key length of n-bits, n point additions and n point duplications are required when both numbers consist of all bits equaling '1'. Statistically, one of the four combinations of bits will be zero, thereby requiring n*¾ point additions and n−1 duplications.

The above is valid for straight forward binary schemes. More advanced schemes can be taken into account, like for example joint sparse format (JFS) where $u_1$ and $u_2$ are transformed to provide a maximum number of zero combinations, to reduce the number of additions. It is known that the minimum number of operations for better verification schemes is ~n/2 point additions and n−1 duplications. Thus, to support 256-bit key scheme, the JSM requires at a minimum ~128 point additions and 255 point duplications. Both operations require modular arithmetic, with reduction modulo prime number p (modulus) defined for a curve chosen by the respective standard. Modular arithmetic relays on basic large number arithmetic. The size of the arithmetic calculations is equal to the key length defined for a given curve (e.g. 128-bits, 256-bits, 384-bits, and 512-bits).

The safety messages are generated by applications in the US standard, or by a networking layer in the European Union standard, triggered by corresponding applications. This layer generates data, including location, speed, direction, time, size of a vehicle, etc. The data is provided to the security layer for encapsulation and creation of a secured message. It is referred as unsecured data or payload in V2X security standards. The security layer creates secure message including described payload, signer information, generation time, application ID, and a trailer including signature and optionally a certificate. An example structure of a basic safety message (BSM) message 400 is provided in FIG. 4. The BSM 400 includes a collection of data to be signed 412, which includes a HashID8 of ITS station certificate 414, a generation time 416, and the data payload (including location, speed, direction, size of a vehicle, etc.) 418. A signature is then generated for the BSM at 420.

The signer information may be of a form of a certificate or a digest of a certificate to be used for verification of the BSM 400. The certificate is sent every one second, or based upon requests from other ITS stations. The receiver caches the certificate and uses it for verification of all following messages signed using the same identity. The identity change is happening due to privacy requirements, and it happens every few or tens of minutes, meaning that thousands of messages are authenticated with the same identity. The certificate comprises information about the issuer (certification authority), validity period, region restrictions, application permissions, public verification key and ECDSA signature. The issuer points to another certificate of certification authority including similar information as of end entity.

Thus, the inventors have recognised and appreciated that a primary problem of V2X ECDSA verification is the required computational complexity that determines how many messages from other ITS stations one can process and use. For instance, for 256 bits curves, the complexity of ECDSA verification is at level of about 3000× modular multiplications, which is a large number of multiplications followed by modular reductions. The performance of the large number of multiplications and modular reductions varies per implementation. In an example implementation that supports 400 verifications/s, a single verification needs to be done in 2.5 msec, thus a single modular multiplication in 833 nsec, is used to meet the performance. For a 256-bit key, modular multiplication is 256-bit×256-bit inputs into 512-bit output multiplication, followed by 512-bit input modulo 256-bit modulus into 256-bit output reduction. In hardware, modular multiplication can be achieved in a single cycle. In software, where the underlying architecture is often 32-bit (or 64-bit for high-end processors), modular multiplication requires series of lower bit width operations. Therefore, software implementations on a generic processor, but also on DSP processors, are very computationally intensive. Due to this complexity, verification is often accelerated by specialized hardware which implements all or a subset of the operations presented above. The software implementations are much slower in comparison to hardware implementations; therefore reducing a number of messages and ITS stations that another ITS station can process and observe. In most cases, hardware accelerators have a higher limit of the supported verifications per second. However, it is envisaged that they can also benefit from the concepts herein described to reduce the number of operations performed per verification.

SUMMARY OF THE INVENTION

The present invention provides an intelligent transportation system, a host processor, an ITS station and a method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
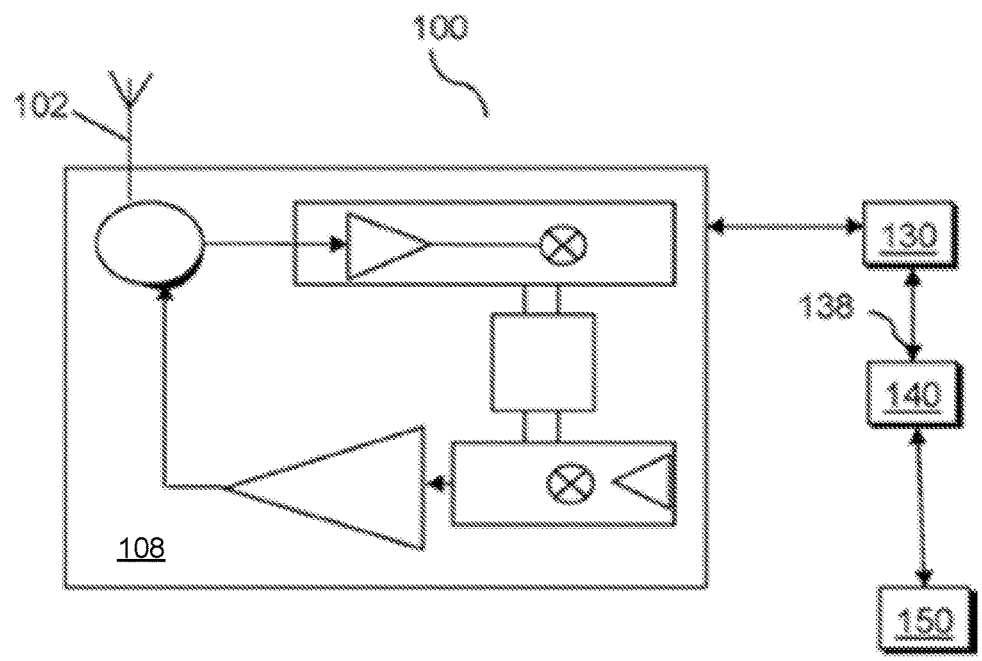
FIG. 1 illustrates a simplified known block diagram of an ITS station.
Figure 2:
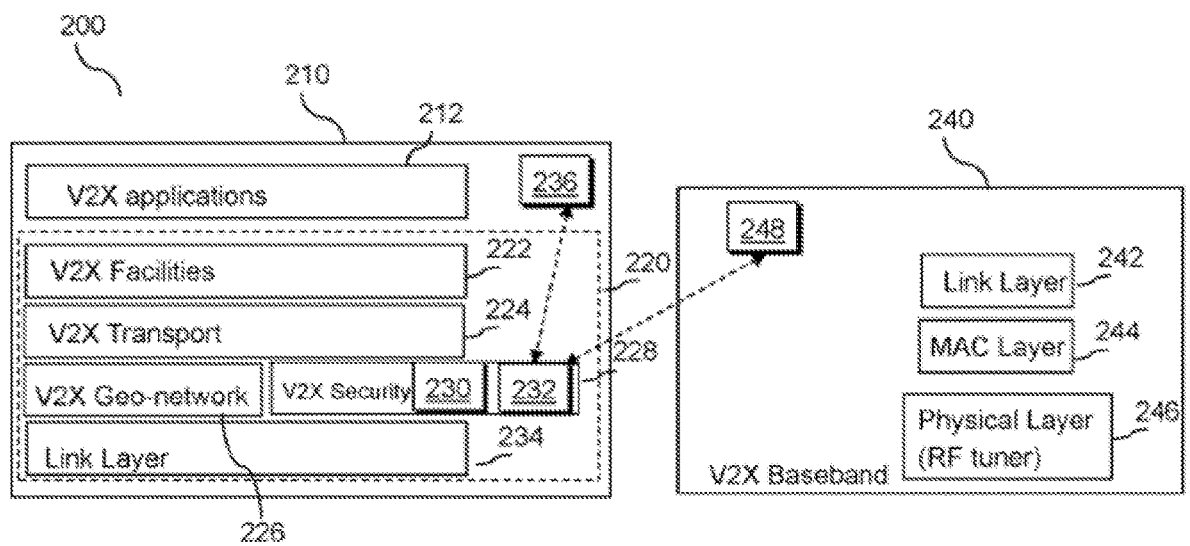
FIG. 2 illustrates a simplified known block diagram of V2X protocol stack supporting security.

The inventors of the present invention have recognized and appreciated that the verification process for ITS messages broadcasted by other ITS stations, requires a huge amount of processing, particularly given that any ITS station may receive messages from up to a hundred or more neighbouring ITS stations at any one time. The inventors have understood that as the ITS station's verified neighbouring ITS stations change relatively slowly, a precomputation of an initial or early message from an ITS station, such as a vehicle, may be used to speed up subsequent verifying operations performed for the same surrounding ITS stations.

In accordance with a first aspect of the invention, an intelligent transportation system, ITS, station is described that includes a host processor; and a memory operably coupled to the host processor. In particular, the host processor is configured to: perform verification per identity that includes precomputation of data for a plurality of neighbouring ITS stations of the ITS station; precomputation data for the verified identities of the plurality of neighbouring ITS stations in the memory and extract from memory and use the stored precomputation data for a respective neighbouring ITS station and perform an accelerated verification of a subsequent message received from that neighbouring ITS station. In this manner, the precomputation and storage for subsequent use of information related to the verification of the transmitting ITS station can speed up subsequent verifications when receiving multiple messages from the same ITS station.

Although examples of the invention describe a number of precomputation approaches and system architectures, together with a number of precomputed table management structures, it is envisaged that many other associated architectures and memory storing structures could benefit from the concepts described herein to speed up verification processes in an ITS system. Furthermore, although some examples of the invention are described with reference to precompute-based ECDSA verification, it is envisaged that the concepts herein described may encompass computation of data based on identities provided via safety messages, or via preloaded certificates, or any other means.

Some examples of the present invention provide a technique that speeds up ECDSA verification significantly by observing that the elliptic points in the verification algorithm are related to a given observed ITS station and only scalar multipliers are related to a given message. Therefore, precomputation for certain elliptic point's related may be performed at the time when a message containing an identity of a new ITS station is received. These precomputations may be stored and used to speed up verifications of all subsequent messages coming from this particular ITS station. The term precomputed encompasses a calculation during a $1^{st}$ or similarly initial verification that is more than strictly needed for that particular message. This extended calculation is performed, in order to obtain, store and provide hints or an indication that is useful during subsequent verification computations of later messages. In examples of the invention, multiple messages arriving from a particular ITS station are signed with the same identity and, hence, this provides a benefit when extra computations are performed after receiving an identity of the same sender.

In some examples of the present invention the precomputations may be performed for each observed ITS station separately. In some examples of the present invention, dynamic control of these precomputations may be adapted to changing road scenarios, in which new ITS stations are appearing at certain rates and these ITS stations are observed for a time-limited period to take into account linking the verification to a physical (V2X) world. In this manner, a major verification speed up, of for example 2.5×, may be achieved.

In some software-based verification examples, the verification process is much faster, thereby enabling use of generic compute resources rather than hardware accelerators. Hence, less specialized, less expensive, and more flexible systems may be implemented, thereby reducing the entry barrier for systems without hardware verification acceleration. It is noted that the concepts herein described are also applicable to hardware realizations, provided sufficient memory is available.

In some examples, the host processor may be configured to receive at least one message from a neighbouring ITS station of a plurality of neighbouring ITS stations and perform verification of at least one from a group of: an identity of the neighbouring ITS station that transmitted the at least one message, a certificate identifying the neighbouring ITS station, an identity of the received at least one message.

In some examples, the precomputation of data for a plurality of neighbouring ITS stations of the ITS station comprises the host processor being configured to precompute at least one security parameter from a received message, wherein the at least one security parameter is from a group of: a public key, $P_A$, of the neighbouring ITS station, a Curve base point, G, of a curve that the neighbouring ITS station is using.

In some examples, the host processor may be configured to perform an Elliptic Curve Digital Signature Algorithm, ECDSA, verification to obtain at least one Elliptic Curve, EC, point, for subsequent verification use. The host processor may be configured to fix, for a period of time, the at least one EC point identified by the neighbouring ITS station's public key. The host processor may be configured to perform precomputation of a first message containing a certificate received from the neighbouring ITS station to extract the at least one EC point identified by the neighbouring ITS station's provided in the neighbouring ITS station's certificate.

In some examples, the host processor may perform at least one of: precomputation of ECDSA supporting data during reception of a message containing a certification; precomputation of ECDSA supporting data at a moment when the host processor decides that it is worth speeding up the verification process of messages coming from particular ITS station.

In some examples, the host processor may be configured to include an accelerated verification unit configured to use stored precomputed data of Elliptic Curve Digital Signature Algorithms, ECDSA, to verify an integrity and/or authenticity of subsequent messages or certificates of at least one transmitting ITS station. In some examples, the accelerated verification unit may be configured to transform scalar values ($u_1$ and $u_2$) of extracted information to joint sparse format, JSF, joint scalar multiplication, JSM notation. In some examples, host processor may be configured to populate a plurality of tables with precomputed data of the transformed scalar values ($u_1$ and $u_2$) from the ITS station, and in some examples may be configured to populate only a subset of base tables using point duplications of the precomputed data of the transformed scalar values ($u_1$ and $u_2$) by negating the subset of tables from the plurality of tables and ignoring any table that is full of zeros.

In some examples, the host processor may be configured to perform dynamic control of the precomputations by adapting stored precomputation data according to changing road or traffic conditions scenarios and optionally adapt stored precomputation data dependent upon how many new ITS stations are observed at a rate and over a time-limited period.

In accordance with a second aspect of the invention, a host processor according to the first aspect is described.

In accordance with a third aspect of the invention, a method for operating an ITS station is described. The method includes at a host processor that is operably coupled to memory: performing verification per identity that includes precomputation of data for a plurality of neighbouring ITS stations of the ITS station; storing precomputation data for the verified identity of the plurality of neighbouring ITS stations in the memory; and extracting from memory and use the stored precomputation data for a respective neighbouring ITS station to perform an accelerated verification of a subsequent message received from that neighbouring ITS station.

In accordance with a fourth aspect of the invention, an ITS comprising an ITS station according to the first aspect is described.

Figure 6:
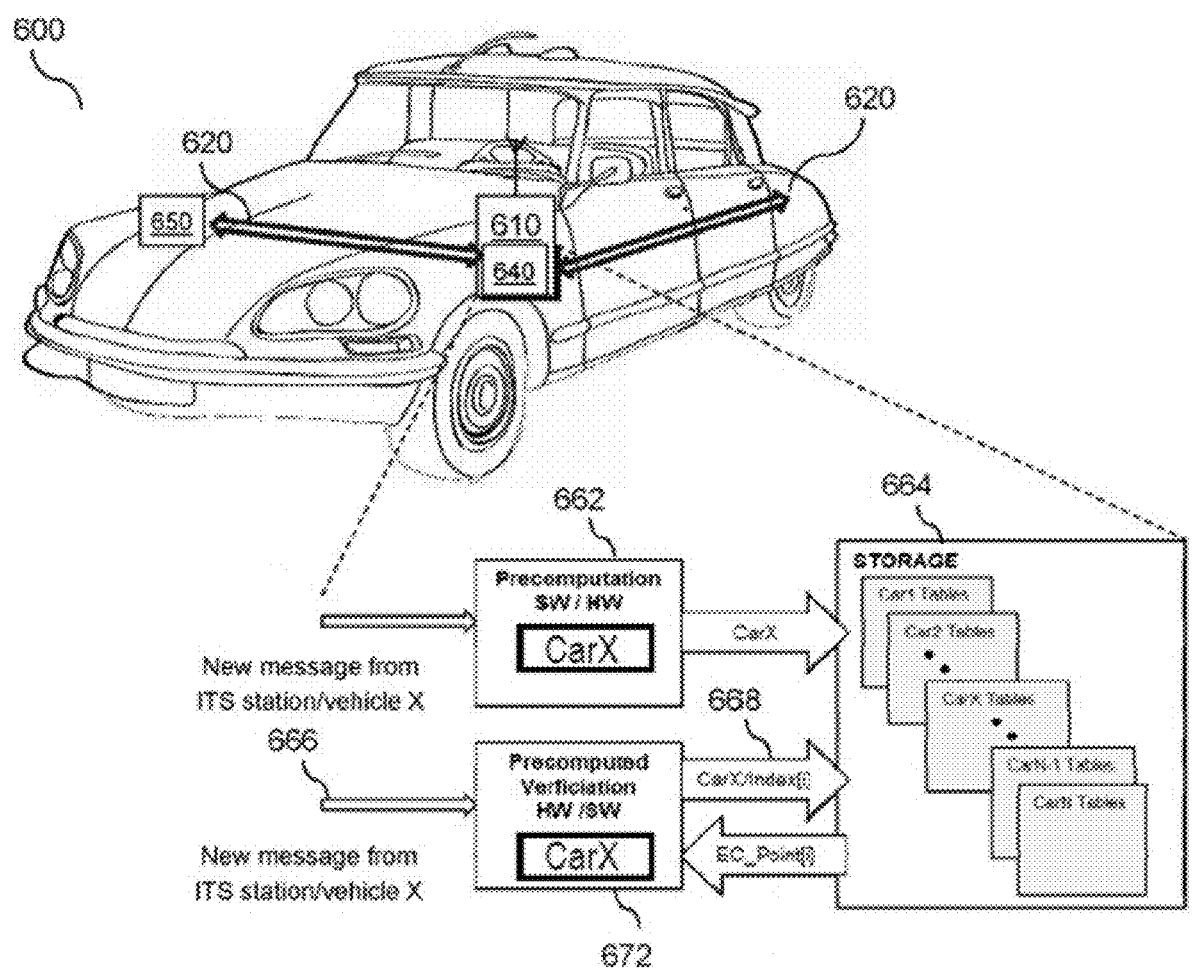
FIG. 6 illustrates a simplified diagram of an ITS station in a form of a vehicle employing an intelligent transportation system, according to example embodiments of the invention.

Although examples of the invention are described with reference to an ITS station in a form of a vehicle, as illustrated in FIG. 6, it is envisaged that the ITS station may be in a form of any road transport unit, such as trucks, motorcycles, buses, etc. or in a form of a handheld unit such as a mobile phone or laptop or a fixed unit, such as a roadside device. Thus, references to ITS station described herein encompass all such concepts and applications.

In some examples, an ITS station may decide to perform computation of supporting data for identities of all known certificate authorities, as these are known in advance. Computed and stored data can then be used to accelerate verification of identities of new ITS stations.

FIG. 6 illustrates a simplified diagram of an ITS station 600, in a form of a vehicle employing an intelligent transportation system 610, according to example embodiments of the invention. In this example, the ITS station 600 includes an ITS 610 that comprises an MCU 640 operably coupled to other circuits and components (not shown). The MCU 640 is operably coupled to other components or circuits in the ITS station, e.g. a speed sensor 650, via, say, an integrated communication bus network 620.

In accordance with examples of the invention, in FIG. 6, the MCU 640 has been adapted to perform precomputation for an identity of a new ITS station X. In some examples the precomputation is performed on the first received message containing a certificate. In some other examples, the precomputation 662 is performed at a later stage. The precomputation may be performed in software or hardware or firmware, dependent upon the specific architecture employed. The precomputation 662 data for the message received from, say, ITS station X, as described later, is stored in memory 664, for example in one of a series of tables related to that particular ITS station. Thereafter, with one or more subsequent messages 666 being received from that ITS station X, a precomputed verification process is performed whereby the MCU 640 determines (e.g. requests or searches) 668 whether precomputation information has been previously stored in memory 664 for ITS station X. If precomputation information has been previously stored in memory 664 for ITS station X, then this information is extracted from memory 664 and the verification of ITS station X is performed 672 much more quickly than known verification processes. In some examples, the precomputation information extracted from memory 664 includes EC point(s) information.

Figure 7:
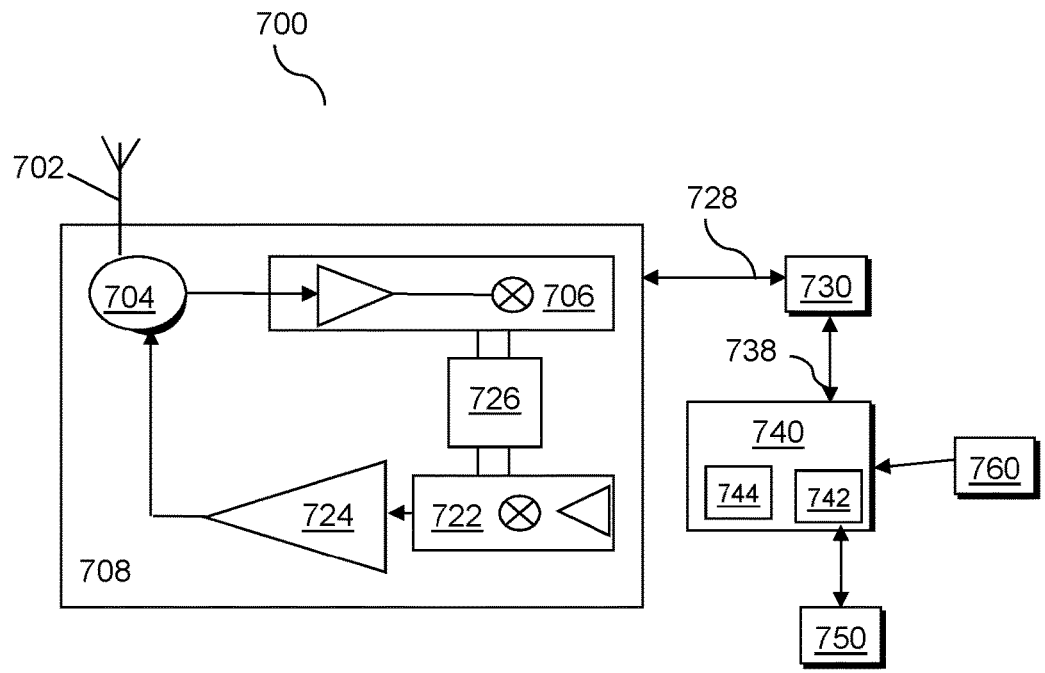
FIG. 7 illustrates a simplified example block diagram of an ITS station, according to example embodiments of the invention.

Referring now to FIG. 7, a simplified example block diagram of an intelligent transportation system (ITS) 700 is illustrated according to example embodiments of the invention. The ITS 700 includes a wireless transceiver integrated circuit 708 that comprises a wireless transmitter and a wireless receiver connected to an antenna 702 via an isolation component or circuit 704, which may be a duplex filter or antenna switch that isolates signals between the transmitter and receiver circuits. In this example, the wireless transceiver integrated circuit 708 is configured to operate at, say, 2.4 GHz or 5.9 GHz. One or more receiver chains, as known in the art, include(s) receiver front-end circuitry 706 (effectively providing reception, low-noise amplification, filtering and intermediate or base-band frequency conversion). In example embodiments, the receiver receives a radio frequency, RF, signal and converts the received RF signal to a digital quadrature received signal. The receiver front end circuit 706, for example, may comprise a low noise amplifier (LNA) coupled to two frequency down-conversion quadrature mixers, fed from a quadrature local oscillator 726. The receiver front-end circuitry 706 is arranged to receive ITS messages broadcast from other local ITS stations or fixed roadside units.

In a transmitter chain sense, the transmitter comprises quadrature frequency up-conversion circuit 722, which contains quadrature up-mixer circuit(s) and may contain amplification and additional filtering circuits, arranged to up-convert differential quadrature signals 728 from baseband (BB) circuit 730 which includes quadrature digital-to-analog converters (DACs). The frequency up-conversion circuit 722 combines the two resultant mixed quadrature signals before being input to power amplifier ($P_A$) 724, which amplifies the combined signal prior to transmission. $P_A$ 724 outputs the up-converted and amplified transmit signal to isolation component or circuit 704 and thereafter antenna 702. The transmitter is arranged to broadcast ITS messages to other local ITS stations or fixed roadside units.

The receiver front end circuit 706 is also coupled to a BB circuit 730, which may be of the form of a digital signal processor (DSP) and comprise quadrature channel low pass filters (LPFs) and quadrature analog to digital converters ADCs. Communication between the wireless transceiver integrated circuit 708 and the BB circuit 730 may use the 802.11p communication protocol. The BB circuit 730 performs the processing up to a data link layer (physical (PHY) layer and part of the medium access control (MAC) layer). The system has a micro controller unit (MCU) 740, sometimes referred to hereafter as a host processor, which is connected, via a universal signal bus (USB) 738, to the BB circuit 730. The BB circuit 730 executes an IEEE1609 stack, and thus converts IEEE1609 messages into RF signals for broadcasting. The MCU 740 is also coupled to a security circuit 750 that is used for signature generation for IEEE1609.2 messages. A speed sensor 760 is connected to MCU 740 and provides ITS station-related data to the MCU.

The MCU 740 includes a processing circuit 742 configured to process the ITS station data (such as speed, direction, etc. received from sensor 760 and adapt a performance of the ITS station in response thereto. The MCU 740 further includes an ITS message generation circuit 744, operably coupled to the processing circuit 742.

In some examples, the MCU 740 may be configured to speed up ECDSA verification significantly by observing that the elliptic points in a verification algorithm are related to a given observed ITS station (identified by the ITS station's public key ($P_A$) provided in its certificate) and to the curve used (G curve base point), whilst only scalar multipliers are related to a given message (message signature). Therefore, the MCU 740 is configured to perform a precomputation at a time when the first message (containing a certificate) of a new ITS station is received, with the results stored and used to speed up verifications of all subsequent messages coming from this particular ITS station.

Given the ECDSA verification equation in Table 1, it is possible to observe the following:

G is a curve EC base point and is fixed for a given curve, as per standard.

$P_A$ is an EC point and a public key of a given ITS station. This point is fixed per ITS station for an extended period of time. Due to privacy rules, this public key may change every now and then; however the time frequency of the change is in the order of minutes and therefore for the purposes of the present invention, and handling data from a particular ITS station over a period of less than a few minutes, it can be assumed that the public key ($P_A$) is fixed per ITS station.

$u_1$ and $u_2$ are derivatives to a given message signature and are changing per message.

Therefore, to speed up the dual scalar multiplications for G and $P_A$ points 'G' is considered as a known point and $P_A$ is considered as unknown and after it becomes known is fixed for a period of time. One example of the proposed precomputation of intermediate data, at the moment $P_A$ is known, together with how to change verification algorithm to make use of the precomputed data in the period when both G and $P_A$ are considered known, is illustrated in FIG. 8.

Precomputation Phase

Figure 8:
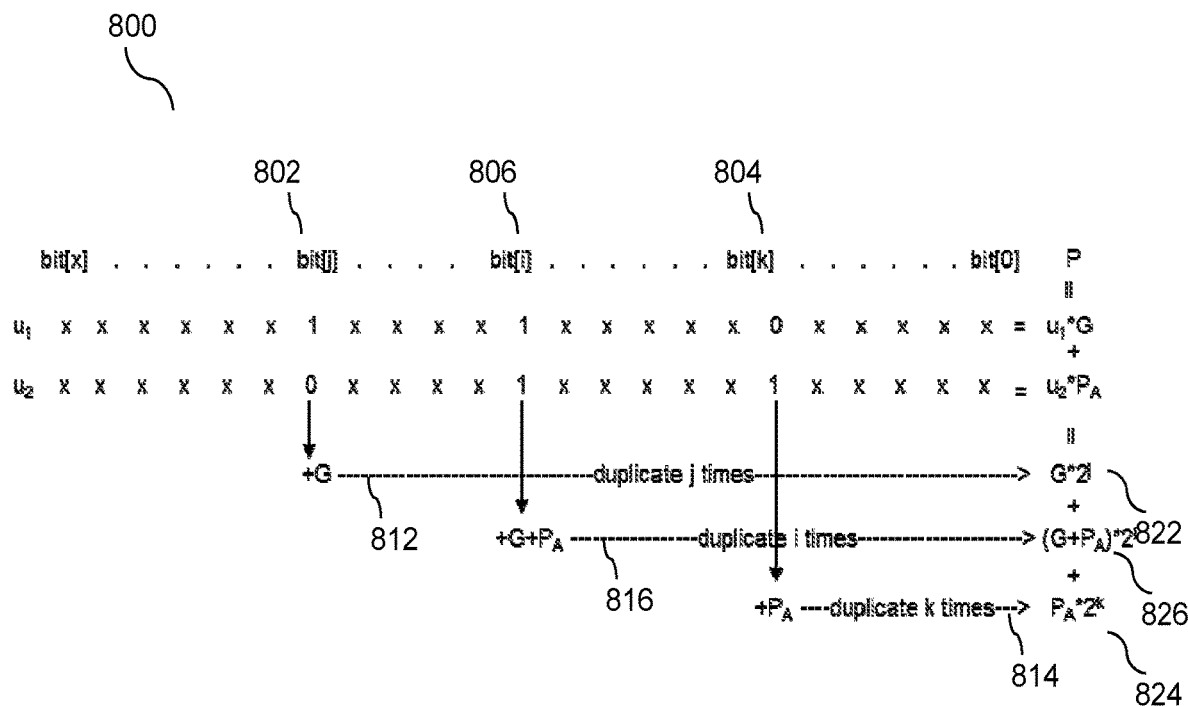
FIG. 8 illustrates a simplified example of a factorization of a joint scalar multiplication calculation, according to example embodiments of the invention.

Referring now to FIG. 8, a simplified mechanism 800 for performing point precomputations for new ITS stations using JSM and a simplified binary scheme, is illustrated according to examples of the invention. Considering JSM, when a simultaneous multiplication of points G and $P_A$ happens, it is observed that at every step of JSM we add G 802, $P_A$ 804, (G+$P_A$) 806, or nothing (in a case of two zeros) and then these are duplicate a representative number of times 812, 814, 816. That means that for each bit position i, where ($u_1[i],u_2[i]$) pair is non zero, there will be $G*2^i$ 822, or $P_A*2^i$ 826, or $(G+P_A)*2^i$ 824 components in the final result, depending on the bit combination.

This means that depending on the bit pattern in $u_1$, and $u_2$ different components of $G*2^i$, $P_A*2^i$, and $(G+P_A)*2^i$ will be present. There are n possible components for each of the 3 types. For a key with n=256 bits, there are therefore a maximum 256 possible components per type.

Therefore, knowing neither $u_1$, nor $u_2$, at the first occurrence of $P_A$ it is possible to prepare 3 tables, which can have all possible combinations of factors that may be a component in a final result for any $u_1$ and $u_2$. Table 2 illustrates one such example precomputed table of a 256-bit binary JSM, according to examples of the invention.

TABLE 2

G is fixed
P is semi-fixed (fixed per car)
$P = u_1 * G + u_2 * P_A$
Precompute 1. 256 entries for T_G $\{2^k * G, \ldots, 2^0 * G\}$
2. 256 entries for T_P $\{2^k * P_A, \ldots, 2^0 * P_A\}$
3. 256 entries for T_GP $\{2^k * (G + P_A), \ldots, 2^0 * (G + P_A)\}$ In one example, as point G is known, a T_G table may be precomputed beforehand. In this example, only tables T_P and T_GP need to be prepared when a new ITS station is seen. The precomputation may be performed by taking the starting point, be it G, $P_A$, or G+$P_A$ and duplicating it n−1 times (255 times for 256 bit key) with initial G+$P_A$ point addition for the combined T_GP table. In this example, a two table precomputation will therefore require a 1 point addition followed by 255+255=510 point duplications. Since one EC point consists of 'x' and of n-bits, for a 256-bit key, one point is 64 bytes, and therefore one table requires 256×64 Bytes=16[Kbytes]. This leads to a certain storage requirement/cost for a V2X receiver for a given number of ITS stations tracked, as illustrated in Table 3.

TABLE 3

| STORAGE COST | | | |
|---|---|---|---|
| 1 Point | 64 [bytes] | | |
| 1 Table | 16 [Kbytes] | 256 Points | |
| 1 Car | 32 [Kbytes] | 2 Tables per car (T_P and T_PG) | |
| 100 Cars | 3.125 [Mbytes] | | |
| 200 Cars | 6.25 [Mbytes] | | |

Precomputation Verification Phase

Usage of precomputation requires changes in the internals of ECDSA verification process. Now using the precomputation tables in Table 2, instead of adding and duplicating at each step, only additions are advantageously needed. Furthermore, all duplications were eliminated by the precomputation phase as precomputation for subsequent messages can benefit from already populated tables for that particular ITS station. Therefore, for the next (subsequent) message for that particular ITS station only a selection of which duplicated numbers to add is needed. At each step depending on the ($u_1[i],u_2[i]$) bit pattern, one of the 3 precomputed tables is selected and then indexed with [i]. The value read from this table needs to be added to the result and the steps repeated, as illustrated in Table 4, for a precomputation verification for a 256-bit binary JSM.

TABLE 4

Figure 3:
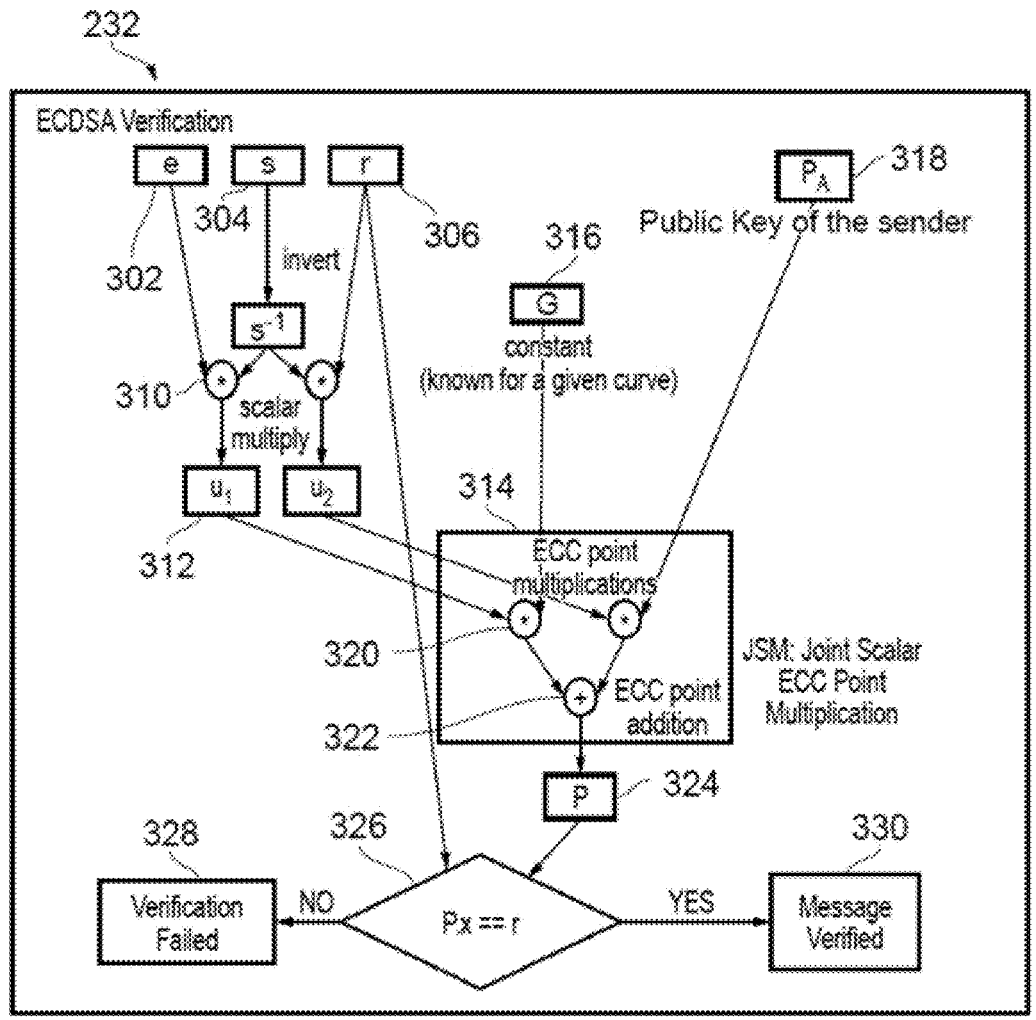
FIG. 3 illustrates a known flow diagram of an ECDSA verification of a V2X signed message.
Figure 4:
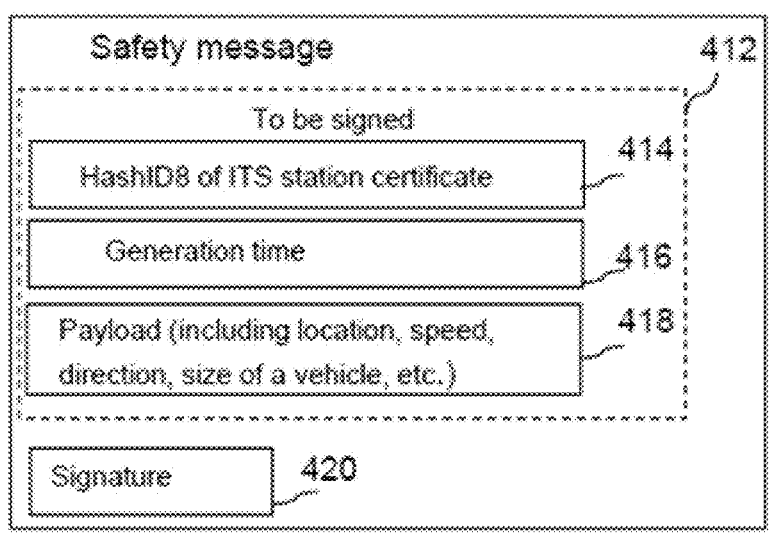
FIG. 4 illustrates a known example of a safety message structure.
Figure 5:
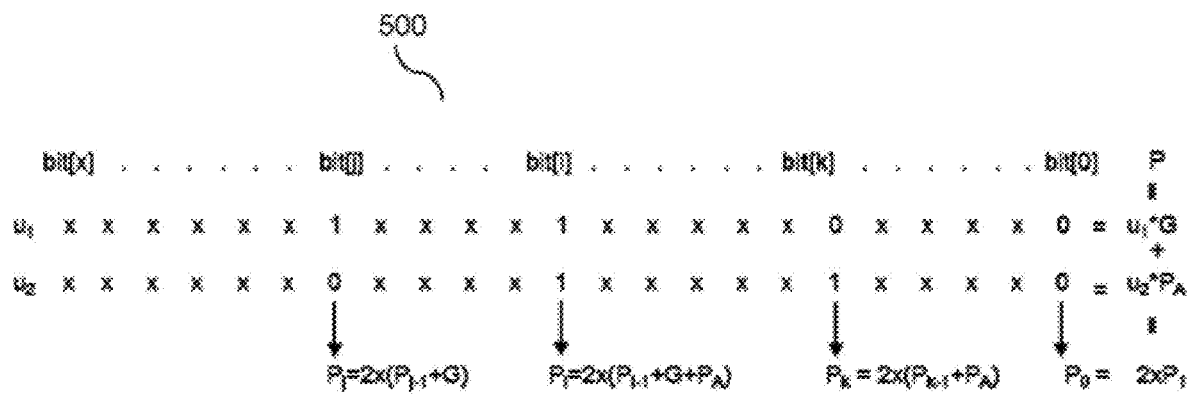
FIG. 5 illustrates a known example of a joint scalar multiplication calculation.
Figure 9:
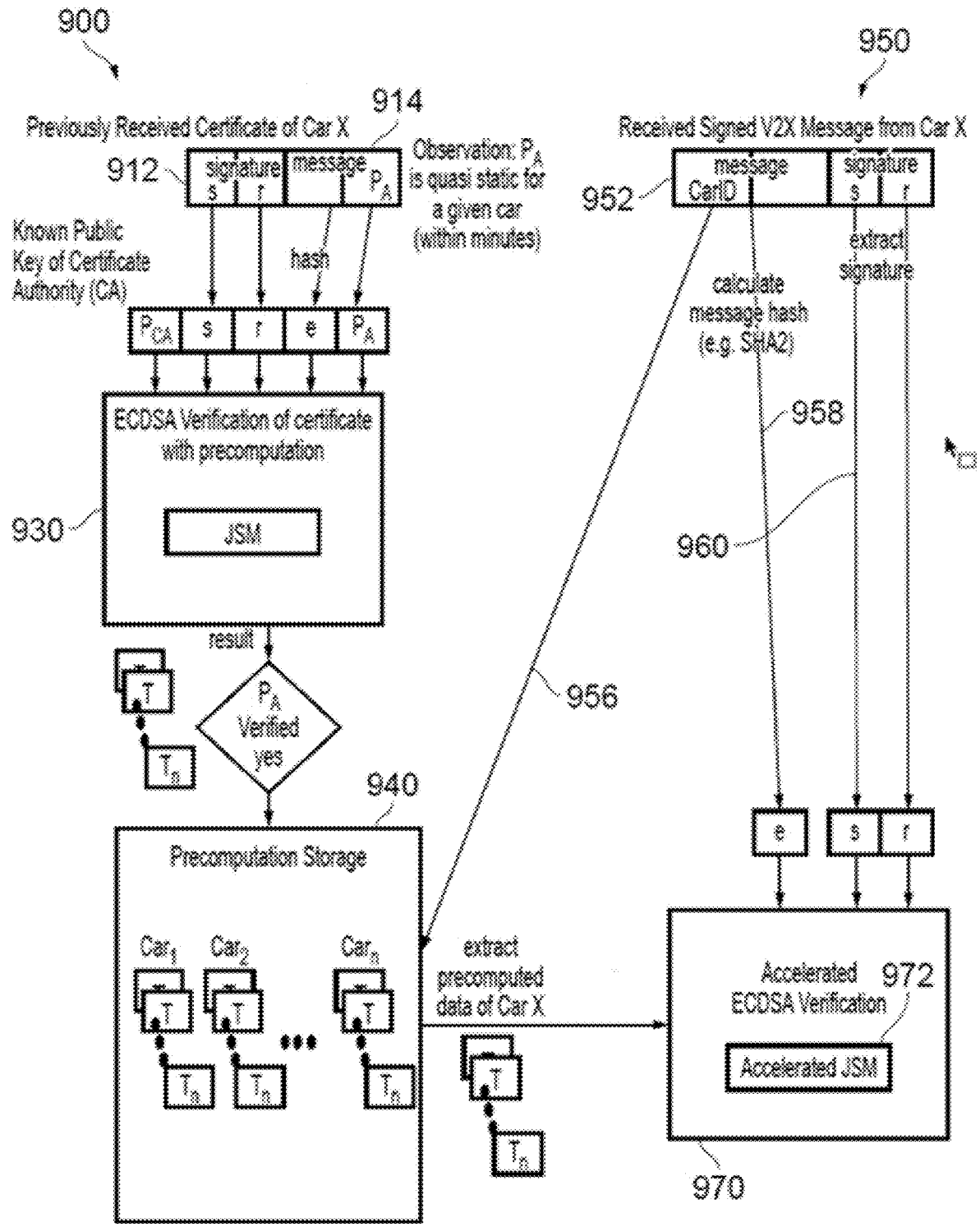
FIG. 9 illustrates an example block and flow diagram of an ITS system realization with precomputation performed during certificate verification, according to example embodiments of the invention.

Compute
$P = u_1 * G + u_2 * P_A$   $u_1, u_2$ in binary notation
ALGO P = 0
    for i = 255 to 0
        switch {$u_1[i]$, $u_2[i]$}
        1  00:skip
        2  01: $P = P + T\_P[i] = P + 2^i * P_A$
        3  10: $P = P + T\_G[i] = P + 2^i * G$
        4  11: $P = P + T\_GP[i] = P + 2^i * (G + P_A)$
        end switch
    end if
    Result = P Referring now to FIG. 9, an example block and flow diagram 900 of an ITS station realization with precomputation performed during certificate verification, is illustrated according to example embodiments of the invention. The example block and flow diagram 900 of ECDSA verifications of a certificate and a message is illustrated. To verify the certificate, an ECDSA message verification process of a host processor of a receiving ITS station extracts signature (r and s 912) information from the certificate 914 and processes a rest of the certificate in order to obtain its hash 'e'. In accordance with example embodiments, next the ECDSA certificate is processed by a ECDSA verification unit 930, which calculates scalar values, e.g. $u_1$ and $u_2$ 312 from e 302, r 306 and s 304, from FIG. 3. This ECDSA verification is described in FIG. 10 and includes a JSM computation 1020. The ECDSA verification unit 930 outputs a result that identifies whether the verification using the public key of a certification authority $P_{CA}$ 1018 has either failed or the succeeded. If the verification succeeded, precomputation data is outputted as well. Further, the ITS station performs a storage operation in memory 940 of the precomputation data calculated in ECDSA verification unit 930.

The memory 940 used to store the precomputation data also receives 956 an ITS station ID 952 extracted from the respective received V2X message 950 from ITS station X. The respective received V2X message 950 from ITS station X also yields the calculated message hash 958 and an extracted signature 960.

Figure 13:
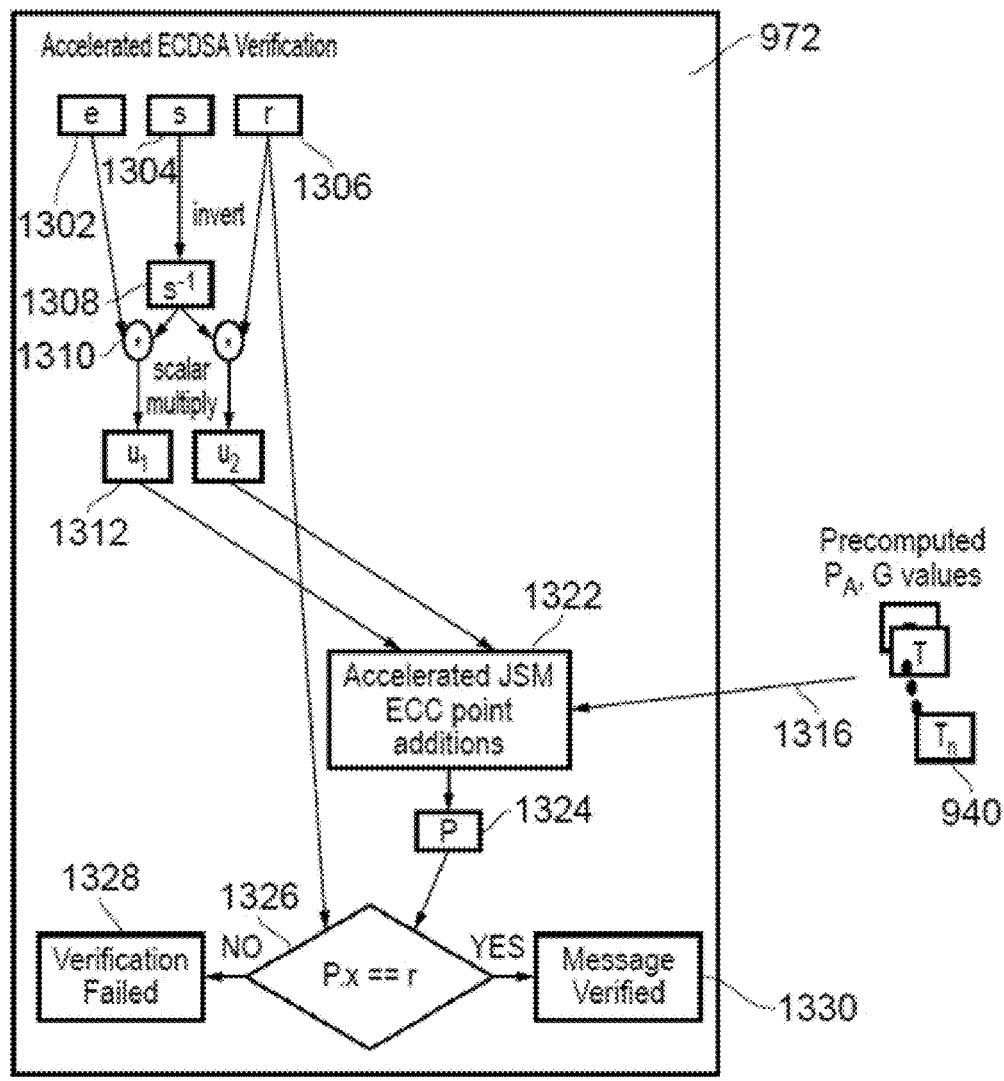
FIG. 13 illustrates an example block and flow diagram of an ITS station realization with accelerated precomputed ECDSA verification, according to example embodiments of the invention.

In accordance with example embodiments, and for each subsequent message received from ITS station X, processing via an Accelerated ECDSA Verification unit 970 is employed. One example of the Accelerated ECDSA Verification unit 970 is illustrated in FIG. 13. In some examples, the Accelerated ECDSA Verification unit 970 comprises an accelerated JSM unit 972, which may be employed all of the time.

Figure 10:
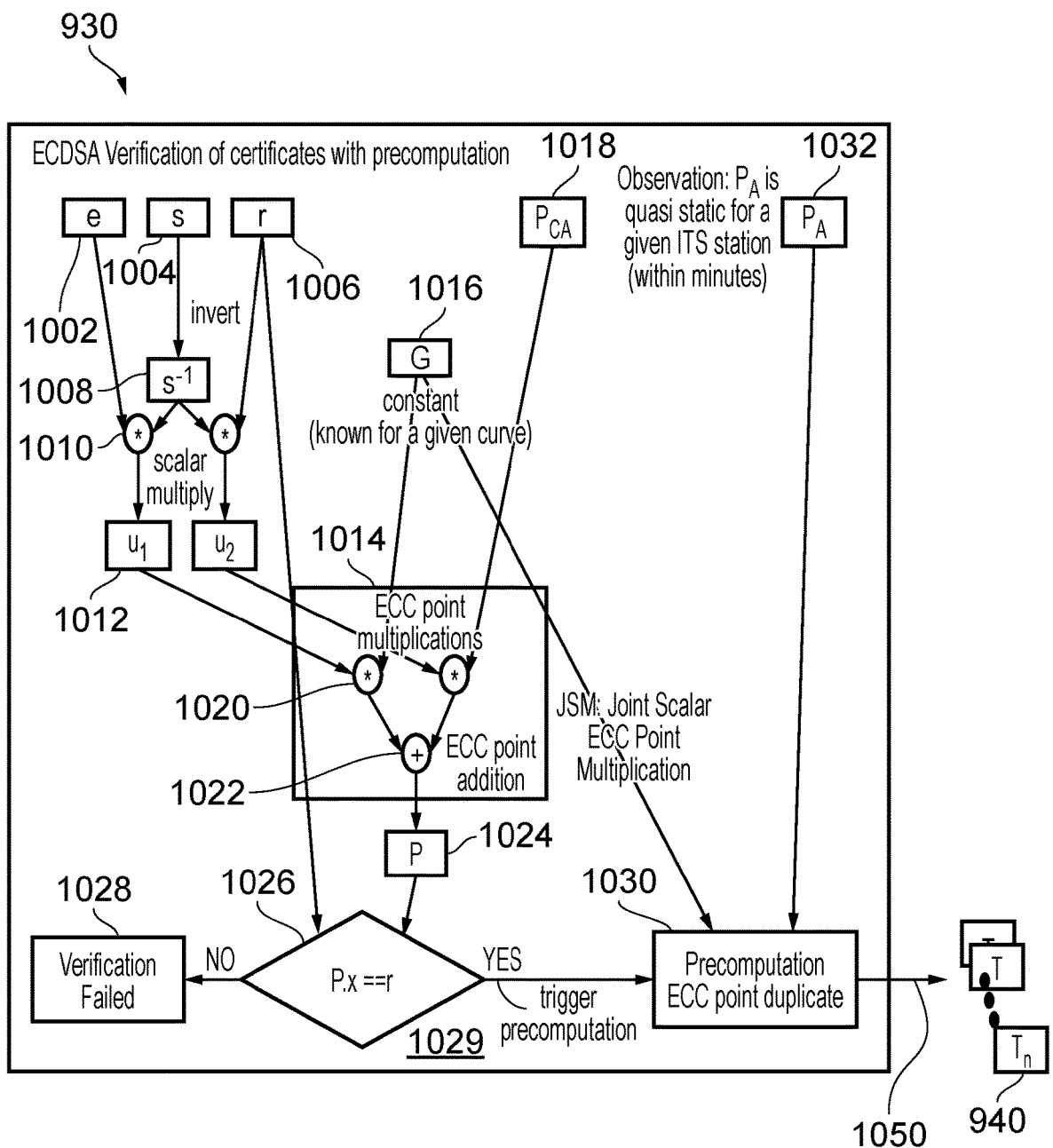
FIG. 10 illustrates an example block and flow diagram of an ECDSA verification of certificates with precomputation for an ITS station, according to example embodiments of the invention

Referring now to FIG. 10 an example block and flow diagram of an ITS station employing verification of a certificate including computation of supporting values for a public key contained in the certificate, for example ECDSA verification unit 930, is illustrated according to example embodiments of the invention. To verify integrity and/or authenticity of a message, a ECDSA message verification algorithm of a host processor 210 of a receiving ITS station extracts signature (r 1006 and s 1004) information from the message and processes the message in order to obtain its hash 'e' 1002. Next the ECDSA message verification 232 calculates scalar values $u_1$ and $u_2$ 1012 from e 1002, r 1006 and s 1004, following modular inversion 1008 of the determined signature s 1004 and performs scalar multiplications 1010. In the main step of the signature verification, two elliptic points (public key of the certification authority $P_{CA}$ 1018 and curve base point G 1016) are multiplied by the scalars $u_1$ and $u_2$ 1012. The scalar values $u_1$ and $u_2$ 1012 are input to an ECC point multiplication circuit 1014, where they are multiplied 1020 by two elliptic points (the public key of the certification authority $P_{CA}$ 1018 and curve base point G 1016). The two resulting points are added in an ECC point addition circuit 1022. The resulting EC point P 1024 is then compared in 1026 with the variable r 1006. The signature verification has either failed 1028 or succeeded. In accordance with some example embodiments, after the message is verified, the precomputation is triggered 1029. A precomputation process is performed in 1030 using curve base point G 1016 and a public key $P_A$ 1032 of a quasi-static particular ITS station. The precomputation ITS station is then stored 1050 in memory 940 for use with subsequent messages received from ITS station X. In this example, the precomputation is performed after certificate verification, but in other examples it may be performed before, or at the same time. For each subsequent message, an Accelerated ECDSA Verification happens, as described with reference to FIG. 13.

Figure 11:
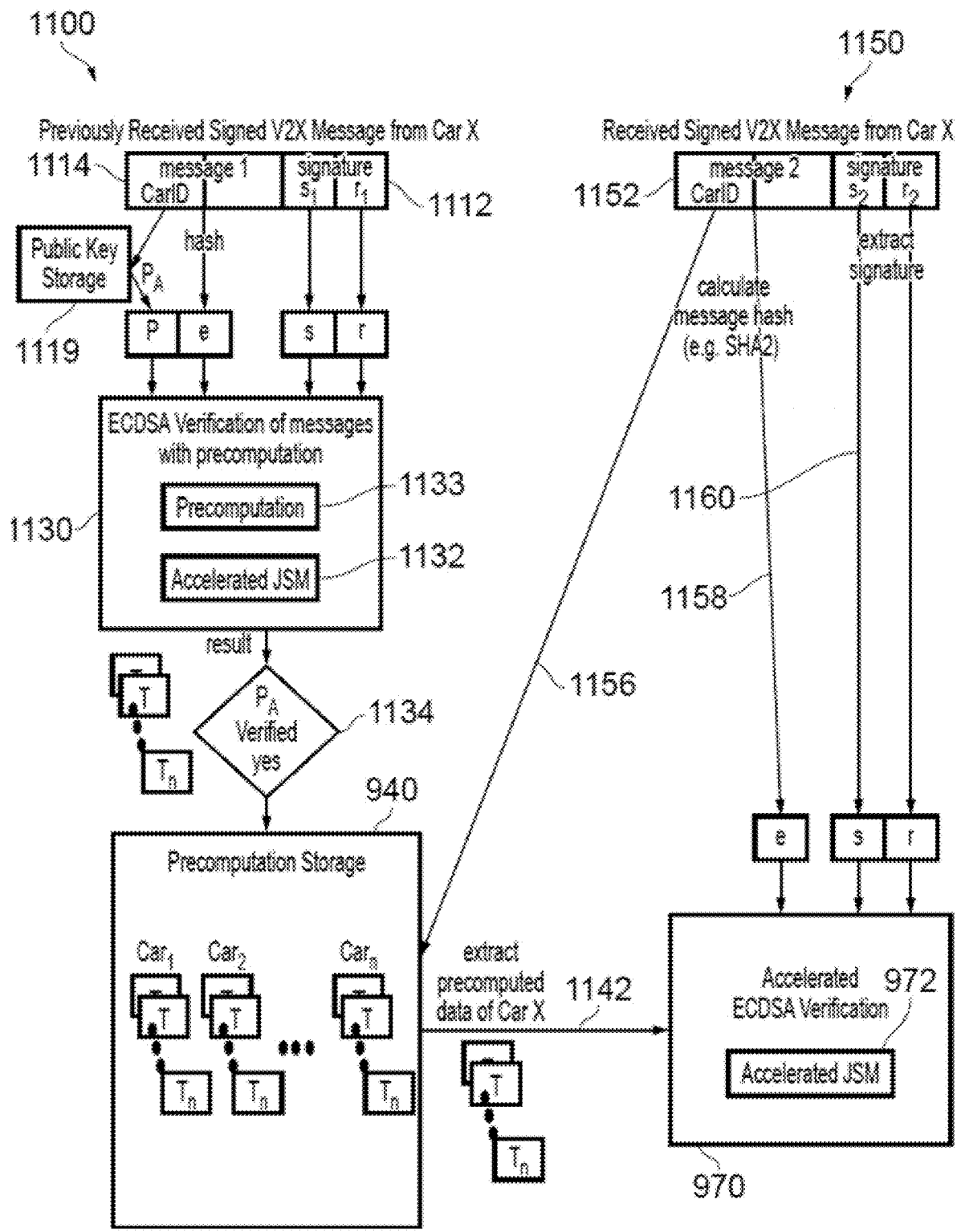
FIG. 11 illustrates an example block and flow diagram of an ITS station realization with precomputation performed during a verification of a first message containing identity information, according to example embodiments of the invention.

Referring now to FIG. 11, an example block and flow diagram 1100 of a second ITS station realization with precomputation performed at later stage when the host processor decides that it is useful to perform the precomputation for an already known ITS station, is illustrated according to example embodiments of the invention. The example block and flow diagram 1100 of an ECDSA verification of a previously-received V2X message for a ITS station X is illustrated. To verify integrity and/or authenticity of a message, an ECDSA message verification process of a host processor of a receiving ITS station extracts signature (r and s 1112) information from the message 1114 and processes the message in order to obtain its hash 'e'. In accordance with this example embodiment, a public key storage 1119 is used to translate the ITS station ID to a usable public key, such that the previously-received V2X message for a ITS station X is processed by a ECDSA verification of messages with precomputation unit 1130, which calculates scalar values, e.g. $u_1$ and $u_2$ 312 from e 302, r 306 and s 304, from FIG. 3. This ECDSA verification is described in FIG. 12 and includes, amongst others, precomputation 1133 and accelerated JSM computation 1132. The ECDSA verification of messages with precomputation unit 1130 outputs a result that identifies whether the message verification using the public key $P_A$ 1032 has either failed or succeeded in 1134. If the message verification succeeded in 1134, the process performs a storage in memory 940 of the precomputation data calculated by ECDSA verification of messages with precomputation unit 1130.

The memory 940 used to store the precomputation data also receives 1156 an ITS station ID 1152 extracted from the respective received V2X message 1150 from ITS station X. The respective received V2X message 1150 from ITS station X also yields the calculated message hash 1158 and an extracted signature 1160.

In accordance with example embodiments, and for each subsequent message received from ITS station X, processing via an Accelerated ECDSA Verification unit 970 is employed. One example of the Accelerated ECDSA Verification unit 970 is illustrated in FIG. 13. In some examples, the Accelerated ECDSA Verification unit 970 comprises an accelerated JSM unit 972.

Figure 12:
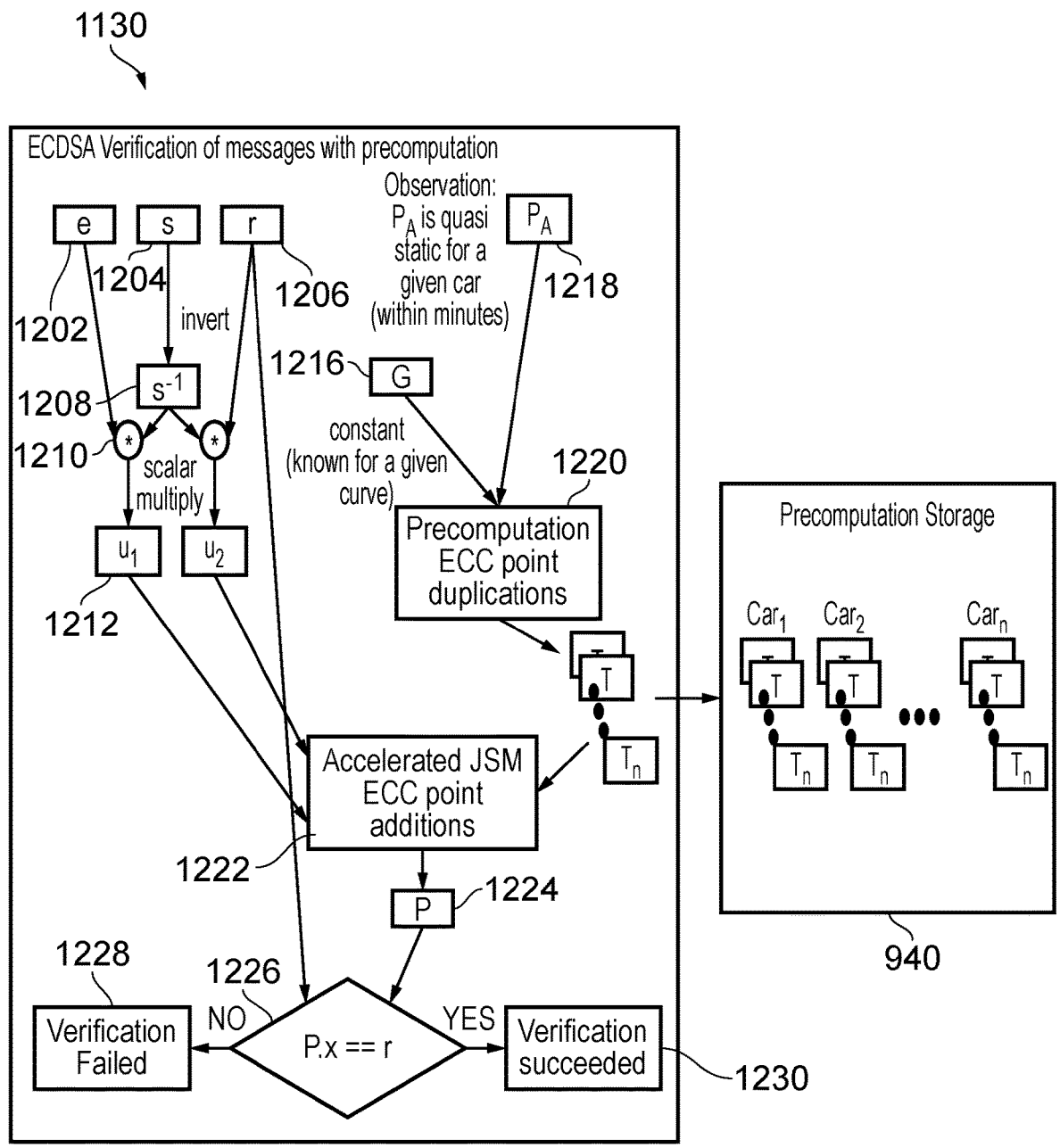
FIG. 12 illustrates an example block and flow diagram of an ITS station realizing ECDSA verification of a message with precomputation, according to example embodiments of the invention.

Referring now to FIG. 12 an example block and flow diagram of an ITS station employing ECDSA verification of messages with identity-based precomputation unit 1130, is illustrated according to example embodiments of the invention. To verify integrity and/or authenticity of a message, a ECDSA message verification of a host processor of a receiving ITS station extracts signature (r 1206 and s 1204) information from the message and processes the message in order to obtain its hash 'e' 1202. Next the ECDSA message verification 232 calculates scalar values $u_1$ and $u_2$ 1212 from e 1202, r 1206 and s 1204, following modular inversion 1208 of the determined signature s 1204 and scalar multiplying 1210. The scalar values $u_1$ and $u_2$ 1212 are input to accelerated JSM 1222 (for example as implemented in accordance with FIG. 8). The result of accelerated JSM, EC point P 1224 is then compared in 1226 with the variable r 1206. The signature verification has either failed 1228 or succeeded 1230.

A precomputation process is performed in 1220 using curve base point G 1216 and the public key $P_A$ 1218 of a quasi-static ITS station. The precomputation data is then stored in memory 940 for use with subsequent messages received from this ITS station. In this example, the precomputation is performed at some time after the ITS station has been noticed, and its certificate (containing $P_A$ 1218) has been verified. For each subsequent message from this ITS station, an accelerated ECDSA verification happens, as described with reference to FIG. 13.

Although FIG. 11 and FIG. 12 describe precomputation during the message verification of the first message containing a certificate with public key $P_A$, it is envisaged that the concept described could equally be applied to a different message, e.g. a second or third message, for example where an ITS station has moved within range, then out of range and back within range, where the message verification may be considered as a non-first message.

Referring now to FIG. 13 illustrates an example block and flow diagram 972 of an ITS station realization with accelerated ECDSA verification using precomputed data, for example as applied to subsequent messages received from an ITS station (such as ITS station X in FIGS. 9-12), is illustrated according to example embodiments of the invention. Regardless of when the precomputation is performed, e.g. according to the first realization in FIG. 9 or the second realization in FIG. 11, subsequent messages can benefit from accelerated (precomputed) ECDSA verification.

In accordance with examples of the invention, employing an accelerated ECDSA verification process by a host processor of a receiving ITS station, signature (r 1306 and s 1304) information is extracted from the message and processes the message in order to obtain its hash 'e' 1302. Next the ECDSA message verification calculates scalar values $u_1$ and $u_2$ 1312 from e 1302, r 1306 and s 1304, following inversion 1308 of the determined signatures 1304 and scalar multiplying 1310.

In accordance with example embodiments, the scalar values $u_1$ and $u_2$ 1312 are input to an accelerated JSM unit that no longer requires any ECC point multiplication circuit, but recovers the two elliptic points (public key $P_A$ 1032 and curve base point G 1316 previously precomputed and stored) from memory 940 and the data is added in an ECC point addition circuit 1322. The signature P 1324 of the message is then verified in 1326 using the variable r 1306. The signature verification has either failed 1328 or the message is verified at 1330.

JSF JSM Example

In some examples of the invention, an enhancement to the previous simple binary scheme is proposed. Here, an example of how precomputation and precomputed verification works for a more optimized solution is described using a joint sparse format (JSF). JSF uses a notation where a bit can have 3 values 0, 1, and −1. By transforming $u_1$ and $u_2$ to JSF notation it is possible to make sure that there is a maximum number of zero columns. JSF is optimal with this respect. Thus, statistically there will be more zero columns than the 25% resulting from the previous binary notation, which resulted in 3*n/4 point additions. For JSF, therefore, at each step of JSM there is a better chance to encounter $(u_1[i],u_2[i])=0,0$ when point addition may be skipped. Thus, JSF has a lower bound of n/2 additions needed, which was already hinted as a lower bound for standard verification in context description.

JSF JSM Precomputation

Since each bit in $u_1$ and $u_2$ can have three values for two bits, there is $3^2=9$ different combinations (0, G, −G, P, −P, G+P, G−P, −G+P, −G+P) that may be encountered during each JSM step. Similarly taking duplications into account it is possible to have a maximum 'n' different components of each of the base values in the end result. Therefore, in this example, tables may be prepared with all possible components, for this there are 8 tables needed to be precomputed (the theoretical 9th table value is full of zeros so there is no need to store it), thereby providing a faster JSF JSM algorithm. This is presented for a 256-bit key in Table 5.

TABLE 5

G is fixed
P is semi-fixed (fixed per car)
P = $u_1$ * G + $u_2$ * $P_A$

| Precompute | | Pre-ComputeCost |
|---|---|---|
| 1. 256 entries for T_G | $\{2^k * G, \ldots, 2^0 * G\}$ | Point Doubles (compile time) |
| 1a. 256 entries for T_NG | $\{-2^k * G, \ldots, 2^0 * G\}$ | Negate T_G (compile time) |
| 2. 256 entries for T_P | $\{2^k * P_A, \ldots, 2^0 * P_A\}$ | Point Doubles |
| 2a. 256 entries for T_NP | $\{-2^k * P_A, \ldots, 2^0 * P_A\}$ | Negate T_P (cheap) |
| 3. 256 entries for T_GP | $\{2^k * (G + P_A), \ldots, 2^0 * (G + P_A)\}$ | Point Doubles |
| 3a. 256 entries for T_NGNP | $\{2^k * (-G - P_A), \ldots, 2^0 * (-G - P_A)\}$ | Negate T_PG (cheap) |
| 4. 256 entries for T_NGP | $\{2^k * (-G + P_A), \ldots, 2^0 * (-G + P_A)\}$ | Point Doubles |
| 4a. 256 entries for T_GNP | $\{2^k * (G - P_A), \ldots, 2^0 * (G - P_A)\}$ | Negate T_NGP (cheap) |

It is envisaged that in other examples a different number of tables may be employed and used by another algorithm, with the above 8 tables being one such option.

Again, since G is known for a given curve, two tables 'G' and '−G' related may be prepared beforehand (for example at compile time or design time). Furthermore, and advantageously, a negation of an EC point results in an order of magnitude less complex than a single point duplication. Therefore, out of the remaining six tables, three tables may be computed from the other three tables by negating each of the entries. In this manner, only three base tables need to be computed using point duplications, which require 3*(n-1) point duplications, neglecting all the negations, see Table 5. For a 256-bit key, a requirement of 3*(n-1)=765 point duplications.

This obviously requires increased time for precomputation in comparison to using the previous binary algorithm by (n-1) point duplications, and will require increased storage by four tables, for example as illustrated in Table 6. In some examples, if negations are performed 'on-the-fly' at each JSM step, only a single extra table needs to be stored.

In this manner, a trade-off of verification speed versus precomputation effort and storage capacity may be adopted. In one example, eight tables may be stored; however, recreating negative values needed for the verification from the positive values of the other four tables is relatively easy and results in a very small addition to the computation time. This yields a saving on memory footprint.

TABLE 6

| STORAGE COST | | |
|---|---|---|
| 1 Point | 64 [bytes] | |
| 1 Table | 16 [Kbytes] | 256 Points |
| 1 Car | 96 [Kbytes] | 6 Tables per car (T_P, T_NP, T_PG, T_NPNG, T_NPG, T_PNG) |
| 100 Cars | 9.375 [Mbytes] | |
| 200 Cars | 18.75 [Mbytes] | |

JSF JSM Precomputed Verification

JSF JSM precomputed verification is similar to binary precomputed verification, just that there are 9 states of $(u_1[i],u_2[i])$ that address eight tables. Furthermore, the same mechanism may be used, in that at every step, based on the state of the scalars, one table is selected that is then addressed by the step counter i. The resulting value is added to the result and the operational steps are repeated.

TABLE 7

```
    G is fixed
    P is semi-fixed (fixed per car)
    P = u₁ * G + u₂ * P_A
ALGO P = 0
    for i = 255 to 0
        switch {u₁[i], u₂[i]}
  1   0,0  Skip
  2   0,1  P = P + T_G[i]        = P + 2^i * G
  3   0,1  P = P + T_NG[i]       = P - 2^i * G
  4   1,0  P = P + T_P[i]        = P + 2^i * P_A
  5   1,1  P = P + T_PG[i]       = P + 2^i * (P_A + G)
  6   1,-1 P = P + T_PNG[i]      = P + 2^i * (P_A - G)
  7  -1,0  P = P + T_NP[i]       = P - 2^i * P_A
  8  -1,1  P = P + T_NPG[i]      = P + 2^i * (-P_A + G)
  9  -1,-1 P = P + T_NPNG[i]     = P + 2^i * (-P_A - G)
        end switch
    end if
    Result = P
```

Combining of Precomputation and Verification

There are many ways of computing two scalar multiplications and many ways for point additions and point duplication using different coordinate systems; hence there are a number of implementation and calculation techniques that can be adopted. However, in examples of the invention and since duplicated data is eliminated during the verification phase completely, it is possible to always speed up the verification process at the expense of precomputations. Therefore, it will be appreciated that precomputed verification is of little use when a majority or all parameters of the verification process are changing. However, it is envisaged in some examples of the invention that precomputed verification is very applicable when used in combination with V2X, where precomputed tables can be used for a relatively long time. The precomputation takes longer than the straight forward verification, but all subsequent messages may be verified much faster using precomputed values, which is particularly useful when an ITS station is receiving multiple messages per second from the same ITS station.

Therefore, in some examples, of the invention, a combining of precomputations and precomputed verification may be performed to take into account the surrounding traffic environment, e.g. a ratio of new cars (messages with new public key for precomputations) versus previously-observed cars (messages with precomputed public keys).

Figure 14:
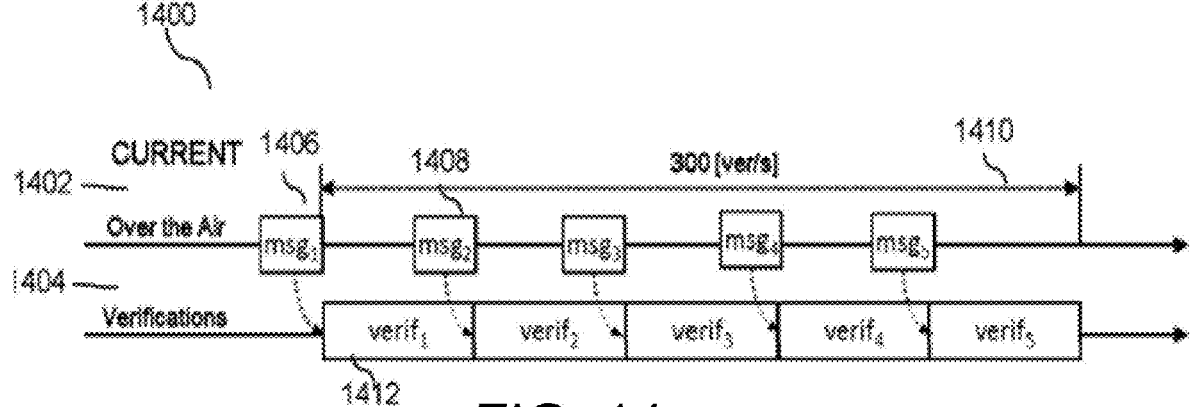
FIG. 14 illustrates a standard approach to a verification of received messages.

In a standard verification approach 1400, as presented in FIG. 14, every over-the air (OTA) 1402 message 1406, 1408 . . . is treated the same and verification 1412 for each message 1406, 1408 takes the same amount of time. The rate of the verifications 1404 per second is fixed and, for example, equal to 300 verifications/sec. 1410.

Figure 15:
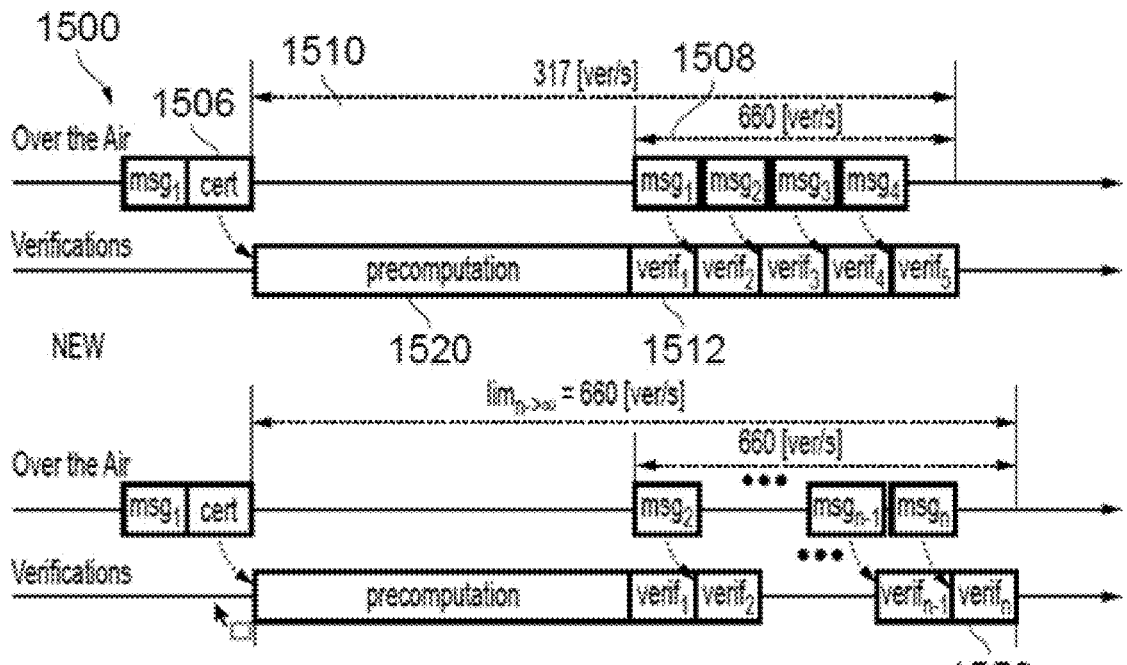
FIG. 15 illustrates an example timing diagram of a verification of received messages, according to example embodiments of the invention.

In accordance with some examples of the invention, two precomputed verification approaches 1500 are presented in FIG. 15, whereby, during processing of the first message 1506 containing a certificate (with new public key) the precomputation 1520 happens. In this example, all the subsequent messages 1508 are thereafter verified 1512 much faster than in the standard case illustrated in FIG. 14, with the processing of each verification taking much longer.

As shown in first part of FIG. 15, there are a certain number of verifications after which the precomputed verification rate (including the overhead of initial precomputation) breaks even in comparison to the standard approach of FIG. 14 (for example 317 verifications/sec.). It can also be seen in the second part of FIG. 15 that with number of messages 1550 approaching infinity the verification rate asymptotically approaches the verification rate as measured without precomputation.

It will be shown in the next section that the verification rate advantageously approaches the limit very fast, and only a handful of messages are needed to break even.

Precomputed Verification at V2X Security System Perspective

In this section we will consider verifications with relations to V2X security system, ITS stations and a typical road situation. In principle, certificates are associated with new ITS stations and messages with the ITS station that have already been observed. The ratio of new ITS stations to previously-observed ITS stations is equal to the ratio of new certificates to messages.

Thus, the precomputations may be performed for each observed ITS station separately, and upon the first observation of the ITS station. However, it is known that the ITS station is transmitting certificates containing its public key intermittently, not continuously. Therefore, the precomputation can be performed at the moment that the certificate including the public key is processed. As illustrated previously, the precomputation can happen at this time as the certificate includes the public key. The ITS station certificate needs to be verified as well in order to validate the public key. Since the ITS station certificate needs to be verified using certificates from a certification authority that are known beforehand, precomputation tables for this operation can be calculated during compile time or initialization.

Figure 16:
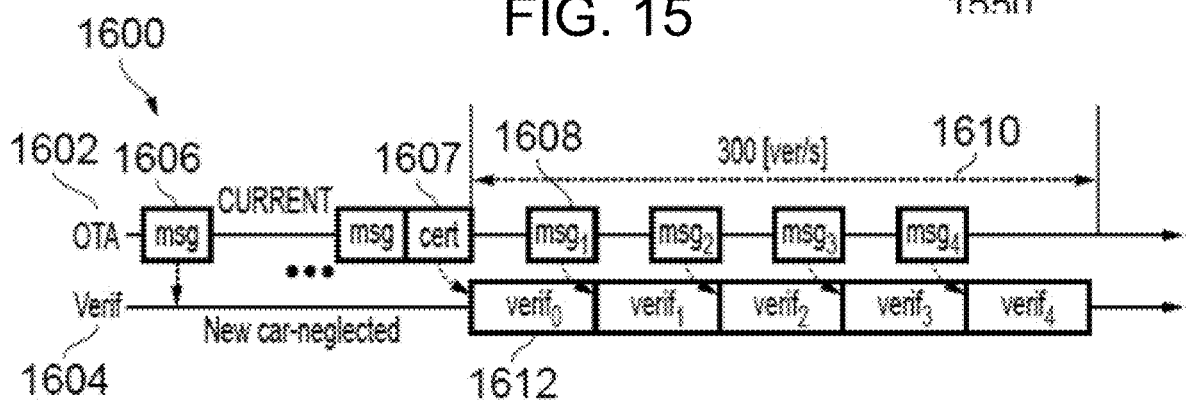
FIG. 16 illustrates a standard approach of a V2X verification system using a known verification technique.

Referring now to FIG. 16, a standard approach of a V2X verification system using a known verification is illustrated. In a standard V2X verification approach 1600, every over-the air (OTA) 1602 message 1606 . . . is ignored until a first certification containing a public key 1607 is received. Thereafter, each verification 1612 for each message 1608 takes the same amount of time. The rate of the verifications 1604 per second is fixed and, for example, equal to 300 verifications/sec. 1610.

Figure 17:
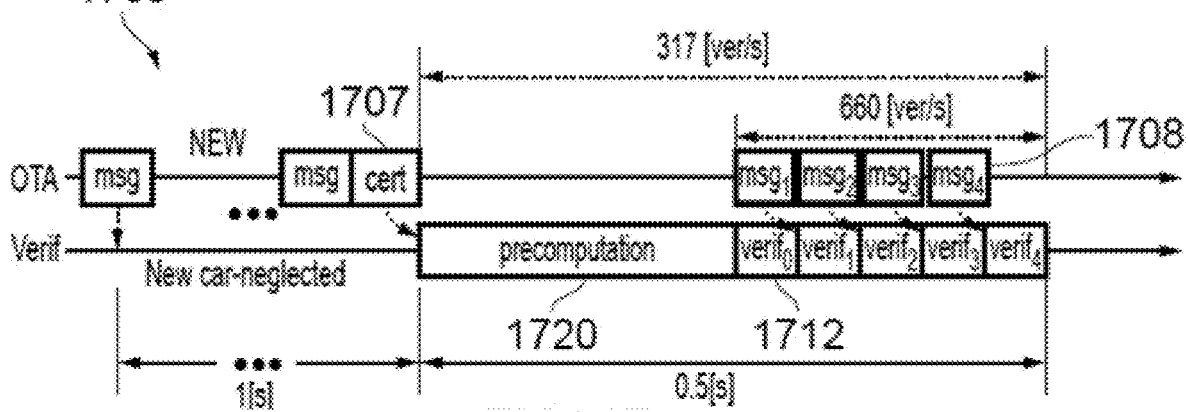
FIG. 17 illustrates an example timing diagram of a V2X verification system using precomputed verification, according to example embodiments of the invention.

Referring now to FIG. 17 an example timing diagram of a V2X verification system using precomputed verification is illustrated, according to example embodiments of the invention. In accordance with some examples of the invention, a V2X verification approach 1700 is presented, whereby, during processing of the first message 1706 containing a certificate 1707 (with new public key) the precomputation 1720 happens. In this example, all the messages subsequent to the fourth message 1708 will be verified 1712 earlier than in the standard case illustrated in FIG. 16, due to the precomputation 1720. In this example, ITS stations are transmitting the V2X messages at rate of, for example, 10 Hz, which equates to every 100 msec, with certificates transmitted once a second. Therefore, as a V2X verification needs to wait for certificate to be able to obtain a public key of a new ITS station, precomputed verifications can only happen after verification of the certificate. In this illustrated example, the break-even point occurs after receipt of four messages, including the certificate 0.5 [s].

Therefore, a new ITS station that was just seen needs to be observed for at least 0.5 second in order to have benefit from the use of the precomputed verification. Such a time interval of 0.5[s], as an example, is a representatively low value with respect to typical road situations. Thus, an ITS station that is only seen (i.e. within range and transmitting) for less than 0.5[s] will be an extremely rare event. Hence, the concept of precomputed verification fits the V2X system particularly well.

Example of the invention further relate to dynamic control of these precomputations, in order to adapt to changing road scenarios or traffic conditions in which new ITS stations are appearing at particular rates. These ITS stations are observed for a given time, which takes into account linking the verification process to a physical V2X world.

Precomputed Tables Management

It will be appreciated that the proposed precomputed tables will be of a finite size. However, it is envisaged that, in some examples, it is possible to 'size' the precomputed tables in order to cover any road scenario that a given V2X receiver may encounter. In order to support the relatively expensive JSF JSM mode approximately 200 ITS stations would require 20 MB. Thus, with the availability of dynamic random access memory (DRAMs) at hundreds of MB in embedded application, it is in practice possible to cover enough ITS stations to support any road situation. For example a 128 MB DDR-SDRAM will support precomputation tables for 1280 ITS stations, and a 1 GB DDR-SDRAM would support 10,000 ITS stations, which is far beyond what is needed.

In some examples, it is envisaged that the respective precomputation tables for a particular ITS station may be held in storage for a reasonable length of time, e.g. more than a few minutes. In this manner, it is possible to further save verification time due to ITS stations appearing and disappearing, for example when travelling on a highway. Similarly, in some examples, it is envisaged that a precomputation may not be performed until an ITS station has been seen a few times, to avoid unnecessary processing for ITS stations that are only observed for a very short period of time.

In some examples, it is noted that management of the precomputed table management, for example by the host processor, is important in order to map a relationship between (a location in memory of) a precomputed table and the public key. In some examples, it is envisaged that such storage may be indexed using (at least a part of) the public key, or an ITS station ID, or other means.

Verification Speed Up

The inventors of the present invention have identified that a significant verification speed up of around twice the speed on average may be achieved by employing the concepts herein described. The known standard verification, as discussed, requires at a minimum $n*\frac{3}{4}$ point additions and $n-1$ point duplications. For a 256-bit key implementation, this equates to 192 point additions and 255 point duplications for standard verification.

In contrast, according to example embodiments of the invention, precomputation for two binary JSM tables requires 1-point addition followed by $(n-1)+(n-1)$ point duplications. Thus, a use of precomputed verification, as explained herein, will require only $\sim n*\frac{3}{4}$ point additions. For a 256-bit key implementation, this equates to 510 point duplications for precomputation and 192 point additions for precomputed verification. As illustrated, precomputed verification is much faster than the standard verification, since all duplications are eliminated following the precomputation phase. Precomputed verification is faster by $(n-1)$ point duplications. If we assume that point duplication requires the same processing time as point addition, the time interval of standard verification is about 1.75"n ($-=3*n/4+n$), whereas the time interval of precomputed verification is $0.5*n$, and the speed up would be approximately 3.5× as fast. However, in practice, the inventors have recognised that point duplication is about 0.7× less complex than point addition and that due to implementation loss of accessing large tables in memory, the practical improvement in speed is between 2-2.5×.

In a case of JSF the number of point additions is further reduced to $n/2$ (128). A standard verification would then require $1.5*n$. The absolute gain is the same 'n' point duplications, but in relative terms the theoretical speed up is 3×, whereas in a practical case it is likely to be closer to 2×.

The overhead of precomputation is, in theory, 2n or 3n for binary and JSF respectively, which is 1.2× (2/1.75) or 2× (3/1.5) more than a single standard verification. In practice, however, and depending upon implementation and chosen algorithms, the break-even point will typically be a few verifications at most.

V2X System Level Speed Up

The speed up calculation mentioned previously is for a precomputed verification only. In some examples, it is envisaged that there may be two (or more) approaches as to how to calculate the benefit of precomputed verification at system level. First, it is possible to combine both certificate verification and further message(s) verifications into a single [combined ver/s] ratio to determine when the breakeven happens. Alternatively, it is possible to consider certificate verification as a special action and associate two separate rates to the factors, namely:

a. Certificate verification: fixed cost b. Message verification: fixed rate=$\lim_{n \to \infty}$[combined ver/s]

Table 8 illustrates the certificates and message verifications split. The combined verification is calculated for both binary JSM and JSF JSM for different coordinates. Although these are merely examples, the trend is clear in that there is a significant benefit of using precomputations for new ITS stations.

TABLE 8

|  | Standard Verification | Jacobian Binary | Jacobian-Chudnovsky Binary | Jacobian-Affine JSF |
|---|---|---|---|---|
| Certificates per second | 300 | 250 | 182 | 166 |
| Verification per second | 300 | 332 | 442 | 724 |

Figure 18:
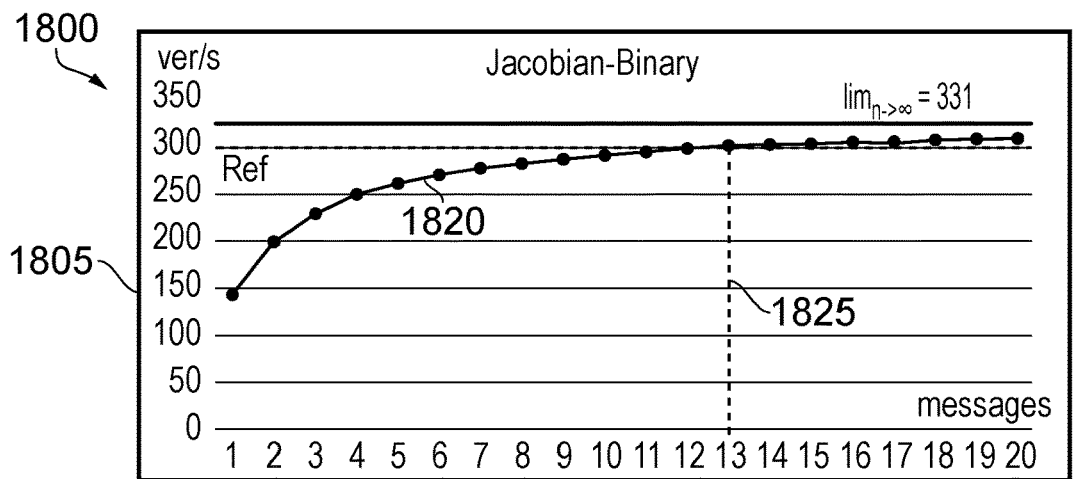
FIGS. 18-20 illustrate graphical examples to determine a breakeven point for using a combined verification rate, according to example embodiments of the invention.
Figure 19:
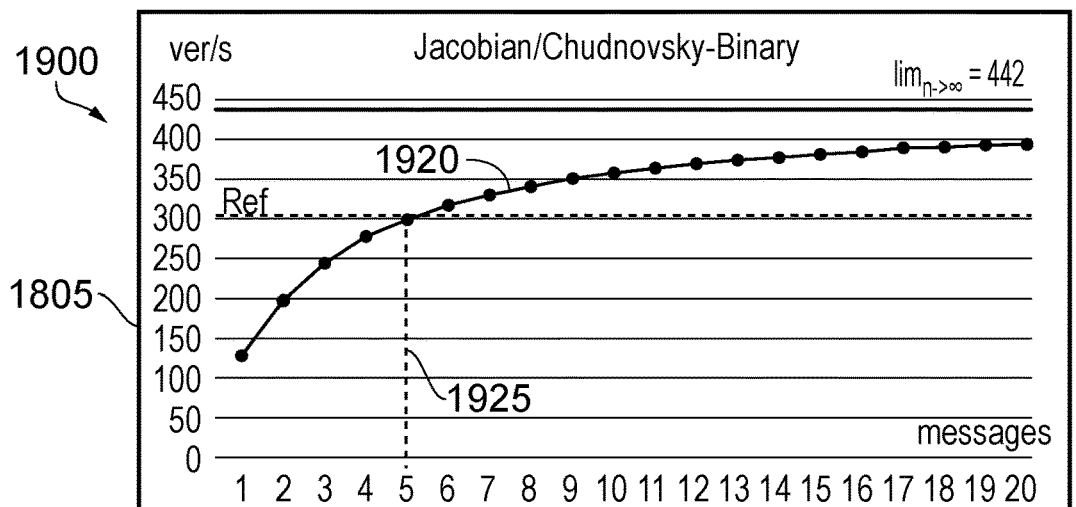
Figure 20:
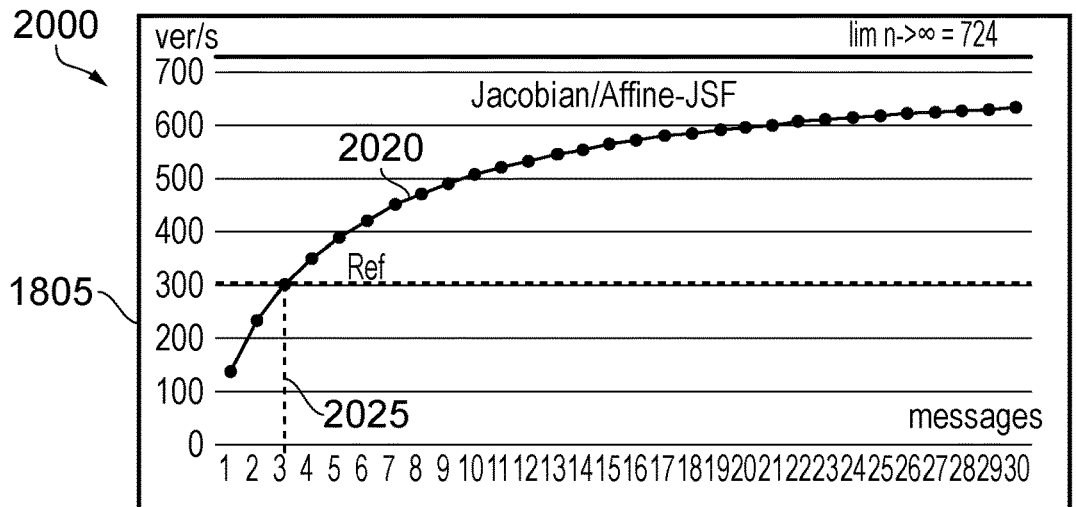

FIGS. 18-20 present graphical examples of the effect of the combined certificate and message verification rate, according to examples of the invention, using various algorithms. The algorithms illustrate a number of verifications/sec. 1805 versus a number of messages 1810 for a Jacobian-Binary algorithm 1800, a Jacobian/Chudnovsky-Binary algorithm 1900 and a Jacobian-Affine-JSF algorithm 2000 and the representative graphical plots 1820, 1920, 2020 are shown. The reference is shown at 300 verifications/sec. For a Jacobian-Binary algorithm 1800, the breakeven point 1825 is 13 messages. For a Jacobian/Chudnovsky-Binary algorithm 1900, the breakeven point 1925 is 5 messages. For a Jacobian-Affine-JSF algorithm 2000, the breakeven point 2025 is only 3 messages.

Although some examples of the invention propose to use software to access the large memory store of precomputed tables and to implement precomputed table management, it is envisaged that in other examples such techniques may be performed in hardware. In some examples, it is envisaged that a hybrid solution may be used where control (e.g. when to precompute and/or what to precompute) is implemented in software, whilst the calculations for precomputations and precomputed verification are realized in hardware.

In some examples of the invention, other than the general benefits of verification speed up it is noted that in particular the software based verifications become much faster, thereby enabling use of generic computing resources, rather than hardware accelerators. Hence, less specialized, less expensive, and more flexible systems may be implemented.

Figure 21:
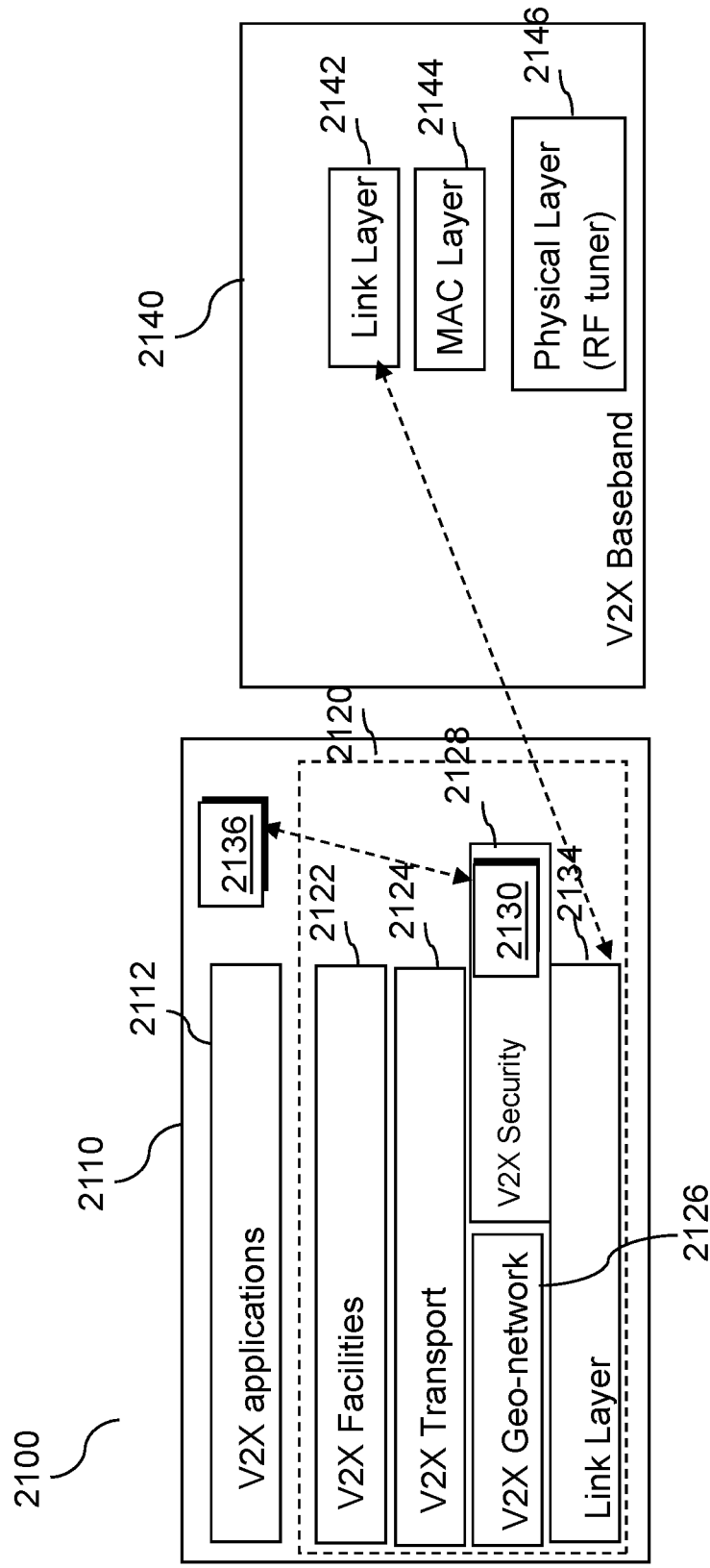
FIG. 21 illustrates a block diagram of a V2X protocol stack supporting security, according to example embodiments of the invention.

Referring now to FIG. 21 a block diagram of a V2X protocol stack 2100 supporting security, according to example embodiments of the invention is illustrated. The V2X protocol stack 2100 includes V2X security 2128, using two chipsets, namely a V2X host processor 2110 and a V2X baseband integrated circuit (BBIC) 2140. In this configuration, the V2X host processor 2110 supports V2X applications 2112 and the V2X stack 2120 includes V2X facilities 2122, V2X transport 2124, V2X Geo-networking 2126, the V2X security 2128 and Link Layer processing 2134. The V2X security 2128 includes hardware (or a software algorithm) configured to perform ECDSA message verification 2130. The BBIC 2140 includes Link layer processing 2142, Medium Access Control (MAC) layer processing 2144 and a Physical Layer 2146, for example performing RF tuning. It is envisaged that other configurations of a modified V2X stack adapted to use precomputed data may be used.

ECDSA message verification 2130 is configured to operate in accordance with the examples hereinbefore described. In FIG. 21, the ECDSA message verification 2130 is configured to communicate with a memory 2136 coupled to host processor 2110 that stores precomputed data associated with ECDSA on a per neighbouring ITS station basis, for use in authentication of messages exchanged between ITS stations. Advantageously, in this example, there is no need to realize an ECDSA message verification hardware-software accelerator located in BBIC 2140.

It is understood that the standards that are adopted around the World may vary, and thus the examples described above, when employed in other implementations, may be replaced by similar technologies or Standard specifications other than IEEE1609.

Figure 22:
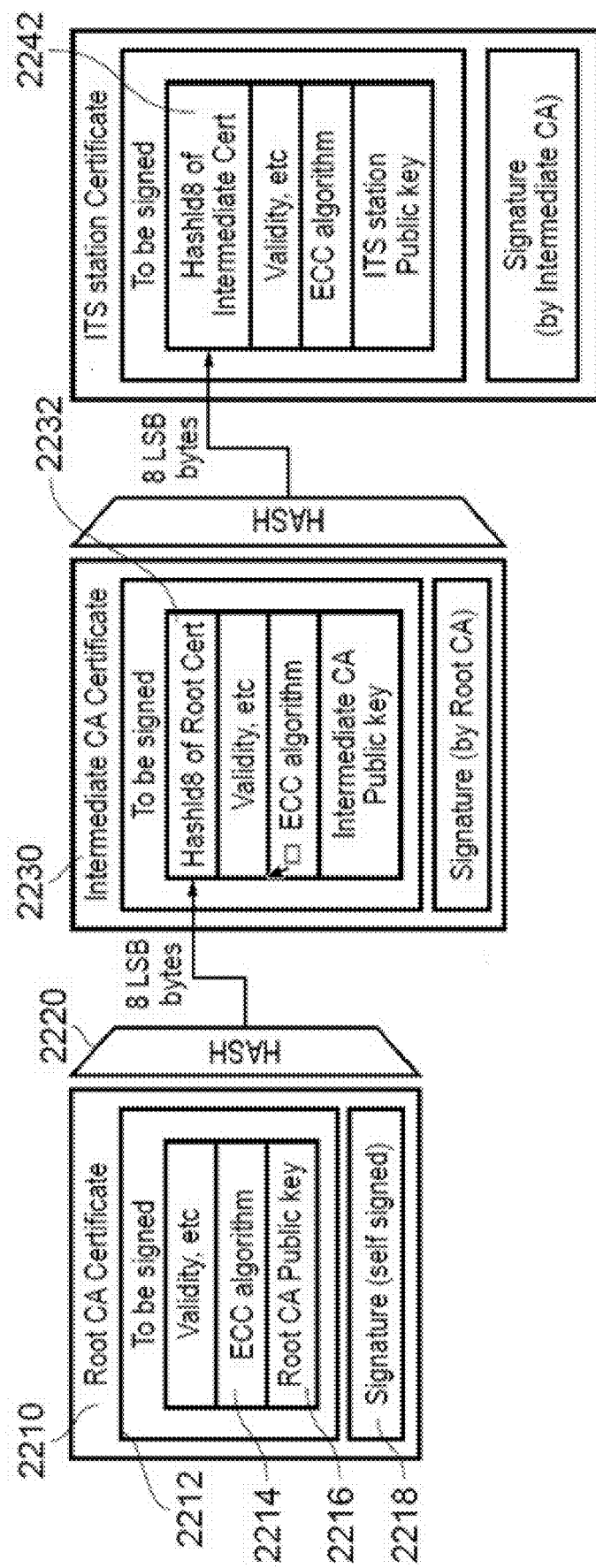
FIG. 22 illustrates an example of one known certificate chain used in ITS.

Referring now to FIG. 22 an example of one known certificate chain used in ITS is illustrated. The certificate chain is very short in the ITS overall architecture. A Root certificate authority (CA) certificate 2210 is the root of trust for the exchanged certificates and messages. The certificate contains a container named data to be signed 2212, which comprises attributes of the certificate (e.g. validity, purpose), ECC algorithm information 2214 (incl. ECC curve type), and public key of the root certification authority 2216. The container to be signed 2212 is processed using a hash function, and the resulting value is used to calculate a signature 2218. The signature of root certificate authority is created by the root certificate authority and, hence, the certificate is self-signed. The root certificate is the only certificate in the certificate chain that is allowed to be self-signed. The next certificate in the chain 2230 (namely, the intermediate certification authority) consists of information about the identity (ID) 2232 of the superior certificate, i.e. of the authority that signed the certificate. The ID 2232 is built using hash function 2220, and the result shortened to 8 least important bytes. The signature 2234 is calculated by the root certification authority, during a certificate generation process. The ITS station certificate is the final certificate in the certificate chain. The ID 2242 in the ITS station certificate points to the intermediate certificate authority 2230. The signature of the ITS station certificate is calculated by the intermediate certification authority 2230.

The root certificate is a static certificate in the overall ITS, and is shared by all participants of ITS. It is updated very infrequently (e.g. every few years). Although one root certificate is shown, there might be more root certificates in the ITS. If this happens they all need to be known to all participants, to allow verification of the certificate chain. There will be more intermediate certificates, e.g. each car manufacturer can act as intermediate certification authority. The number of certificates can be still limited, and updated very infrequently over time (e.g. every few year). In some examples, the ITS supports learning of new intermediate certificates. If an ITS stations sees an ID of an unknown certificate, it will request such certificate(s) and after verification store it/them in internal non-volatile memory. The ITS station's certificates are changing continuously, at intervals of every few minutes. Each ITS station transmits 1 to 10 safety messages per second, resulting in thousands of messages signed using the same ITS identity.

Figure 23:
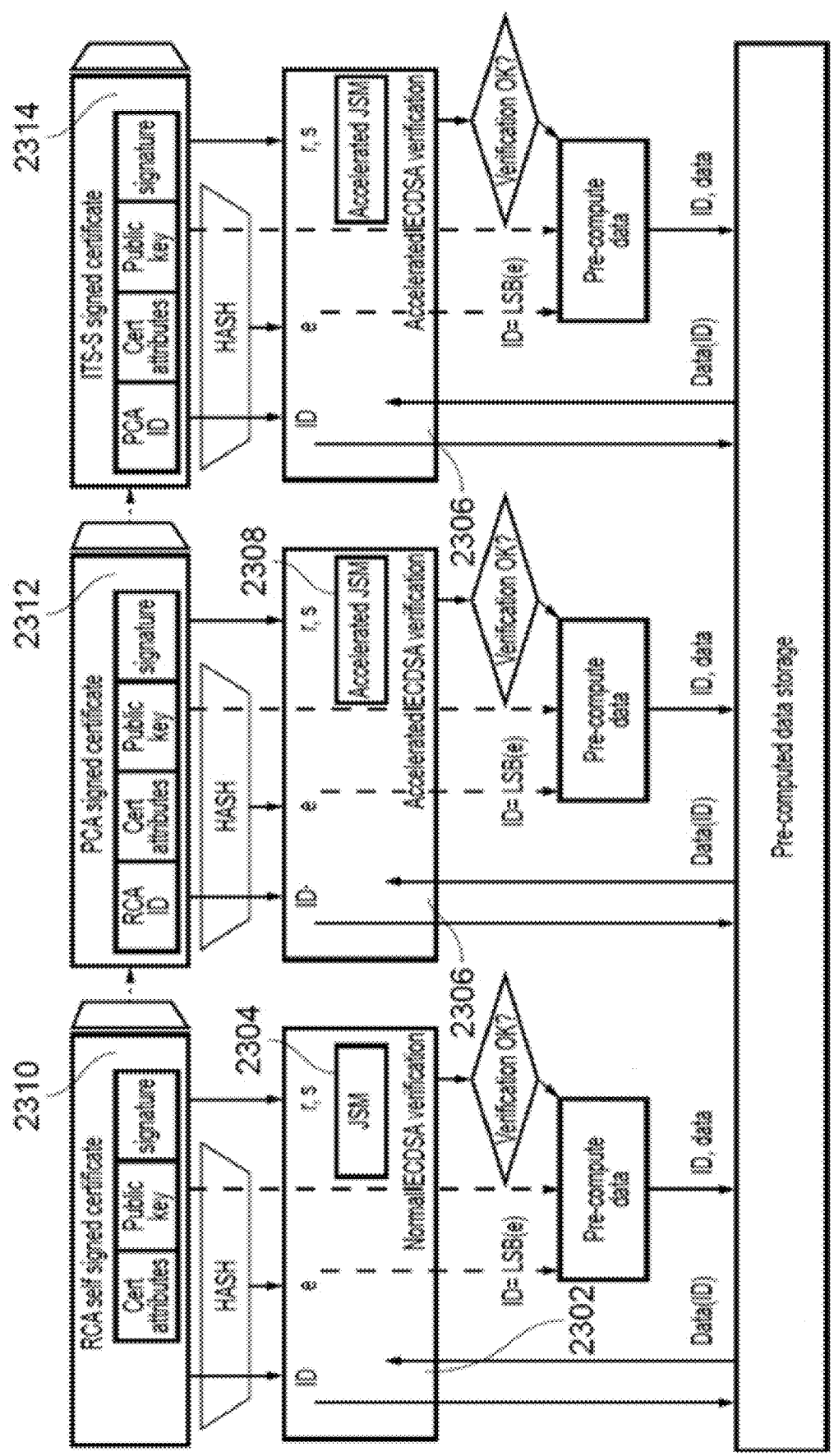
FIG. 23 illustrates an overview block diagram and verification flow for an example of verification of certificates, according to example embodiments of the invention.

Referring now to FIG. 23, an example flow of verifications of certificates is illustrated, according to example embodiments of the invention. The flow shows, left to right, the order at which certificates are verified, and the way they can be verified to achieve improved or optimal performance. Root certificate 2310 is the beginning of the certificate chain, hence the verification of this certificate is performed using standard ECDSA 2302, including standard JSM 2304. Once the root certificate 2310 signature is verified, precomputation is performed in order to speed up verification of subordinate certificates 2312, 2314 . . . . The precomputation data can be stored in non-volatile memory to skip this step in subsequent powering-on of the ITS station. Furthermore, the root certificate is most commonly pre-loaded into each ITS station during manufacturing. Hence, in some examples, precomputation data may be even provisioned together with the certificate. Verification of subordinate certificates may be performed using accelerated ECDSA 2306 with accelerated JSM 2308. The precomputation data related to intermediate certificates (PCA 2312) can be generated following accelerated ECDSA verification in order to speed up verification of the certificates of ITS stations 2314. Since the intermediate certificates are also static, the precomputed data for intermediate certificates may be also stored in the non-volatile memory of ITS station, to omit this step in subsequent powering-on of the ITS station. The verification of neighbouring ITS station certificate 2314 can be performed by accelerated ECDSA 2306, using accelerated JSM 2308. Once the certificate is verified, the ITS station may choose to perform precomputation to enable acceleration for verification of V2X messages coming for already known ITS stations.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement a processing of message verification details as well as certificate verification received from ITS stations, as well as some or all of the other mentioned processor functions. Clearly, the various components within the ITS can be realized in discrete or integrated component form, with an ultimate structure therefore being an application-specific or design selection.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the host processor for an intelligent transportation system, ITS, for an ITS station, such as a vehicle, may be implemented as circuitry located on a single integrated circuit. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An intelligent transportation system (ITS) station comprising:
    a host processor; and
    a memory operably coupled to the host processor,
    wherein the ITS is characterised in that the host processor is configured to:
        perform identity verification for a plurality of neighbouring ITS stations of the ITS station, wherein for each neighbouring ITS station, the identity is based upon a public key (P) associated with that neighbouring ITS station, and upon a curve base point (G) of an Elliptic Curve Digital Signature Algorithm (ECDSA) associated with that neighbouring ITS station;
        perform precomputation of data for each verified neighboring ITS station, wherein the precomputation data for each neighboring ITS station is formed as a table of entries of the form:

$P*2^{(k)} \ldots P*2^{(0)}$, $G*2^{(k)} \ldots G*2^{(0)}$, and $(P+G)*2^{(k)} \ldots (P+G)*2^{(0)}$, where k is a bit length of scalar values (u1 and u2), where u1 and u2 are determined based upon message contents of each message from each neighboring ITS station;
            store, for each verified neighboring ITS station, the table of entries in the memory, wherein P, G, u1, and u2 are nonzero integers; and
            perform message verification for each message received from a particular neighboring ITS station, wherein for each message, the message verification is based upon the scalar values (u1 and u2) determined for each message, and wherein for each message, the message verification includes adding selected entries from the table associated with the verified neighboring ITS station.

2. The ITS station of claim 1, wherein the host processor is configured to receive at least one message from a neighbouring ITS station of a plurality of neighbouring ITS stations and perform verification of at least one from a group of: the identity of the neighbouring ITS station that transmitted the at least one message, and an integrity and authenticity of the received at least one message.

3. The ITS station of claim 1, wherein the host processor is configured to fix, for a period of time, the at least one EC point identified by the neighbouring ITS station's public key.

4. The ITS station of claim 1, wherein the host processor comprises an accelerated verification unit configured to use stored precomputed data and transform scalar values security parameters (u1 and u2) of extracted data to joint sparse format (JSF) joint scalar multiplication, JSM notation.

5. The ITS station of claim 4, wherein host processor configured to populate a plurality of tables with precomputed data of the transformed scalar values (u1 and u2) from the ITS station.

6. The ITS station of claim 4, wherein the host processor configured to populate only a subset of base tables using point duplications of the precomputed data of the transformed scalar values (u1 and u2) by negating the subset of tables from the plurality of tables and ignoring any table that is full of zeros.

7. The ITS station of claim 6, wherein the host processor is configured to perform dynamic control of the precomputations by adapting stored precomputation data according to changing road or traffic conditions scenarios.

8. The ITS station of claim 7, wherein the host processor is configured to adapt stored precomputation data dependent upon how many new ITS stations are observed at a rate and over a time-limited period.

9. The ITS station of claim 6, wherein the host processor is configured to perform processing of a message from the neighbouring ITS station containing a certificate and to extract the at least one EC point identified by the neighbouring ITS station.

10. The ITS station of claim 6, wherein the message verification further includes 1) making a number (k) of bitwise comparisons of u1 and u2, and for each bit comparison (i), and 2) adding to a sum an $i^{th}$ entry of the first row of the associated table of entries ($P*2^{(i)}$) where the $i^{th}$ bit location of only u1 includes a "1, or adding to the sum an $i^{th}$ entry of the second row of the associated table of entries ($G*2^{(i)}$) where the $i^{th}$ bit location of only u2 includes a "1," or adding to the sum an $i^{th}$ entry of the third row of the associated table of entries ($(P+G)*2^{(i)}$) where the $i^{th}$ bit location of both u1 and u2 include a "1."

11. A host processor for an intelligent transportation system (ITS) station, the host processor comprising:
    an interface port for operably coupling to a memory; and
    a processing circuit configured to:
        perform identity verification for a plurality of neighbouring ITS stations of the ITS station, wherein for each neighbouring ITS station, the identity is based upon a public key associated with that neighbouring ITS station (P), and upon a curve base point (G) of an Elliptic Curve Digital Signature Algorithm (ECDSA) associated with that neighbouring ITS station;
        perform precomputation of data for each verified neighboring ITS station, wherein the precomputation data for each neighboring ITS station is formed as a table of entries of the form:

$P*2^{(k)} \ldots P*2^{(0)}$, $G*2^{(k)} \ldots G*2^{(0)}$, and $(P+G)*2^{(k)} \ldots (P+G)*2^{(0)}$, where k is a bit length of scalar values (u1 and u2), where u1 and u2 are determined based upon message contents of each message from each neighboring ITS station, wherein P, G, u1, and u2 are nonzero integers;
            store, for each verified neighboring ITS station, the table of entries in the memory; and
            perform message verification for each message received from a particular neighboring ITS station, wherein for each message, the message verification is based upon the scalar values (u1 and u2) determined for each message, and wherein for each message, the message verification includes adding selected entries from the table associated with the verified neighboring ITS station.

12. The host processor of claim 11, wherein the message verification further includes 1) making a number (k) of bitwise comparisons of u1 and u2, and for each bit comparison (i), and 2) adding to a sum an $i^{th}$ entry of the first row of the associated table of entries ($P*2^{(i)}$) where the $i^{th}$ bit location of only u1 includes a "1, or adding to the sum an $i^{th}$ entry of the second row of the associated table of entries ($G*2^{(i)}$) where the $i^{th}$ bit location of only u2 includes a "1," or adding to the sum an $i^{th}$ entry of the third row of the associated table of entries (($P+G)*2^{(i)}$) where the $i^{th}$ bit location of both u1 and u2 include a "1."

13. A method for operating an intelligent transportation system (ITS) station, the method comprising, at a host processor that is operably coupled to memory:

performing identity verification for a plurality of neighbouring ITS stations of the ITS station, wherein for each neighbouring ITS station, the identity is based upon a public key associated with that neighbouring ITS station (P), and upon a curve base point (G) of an Elliptic Curve Digital Signature Algorithm (ECDSA) associated with that neighbouring ITS station;

performing precomputation of data for each verified neighboring ITS station, wherein the precomputation data for each neighboring ITS station is formed as a table of entries of the form:

$P*2^{(k)} \ldots P*2^{(0)}$, $G*2^{(k)} \ldots G*2^{(0)}$, and $(P+G)*2^{(k)} \ldots (P+G)*2^{(0)}$, where k is a bit length of scalar values (u1 and u2), where u1 and u2 are determined based upon message contents of each message from each neighboring ITS station, wherein P, G, u1, and u2 are nonzero integers;

storing, for each verified neighboring ITS station, the table of entries in the memory; and performing message verification for each message received from a particular neighboring ITS station, wherein for each message, the message verification is based upon the scalar values (u1 and u2) determined for each message, and wherein for each message, the message verification includes adding selected entries from the table associated with the verified neighboring ITS station.

14. The method of claim 13, further comprising:
receiving at least one message from a neighbouring ITS station of a plurality of neighbouring ITS stations; and
performing verification of at least one from a group of: the identity of the neighbouring ITS station that transmitted at least one message, an integrity and authenticity of the received at least one message.

15. The method of claim 13, further comprising configuring the host processor to fix, for a period of time, the at least one EC point identified by the neighbouring ITS station's public key.

16. The method of claim 13, further comprising configuring the host processor to perform dynamic control of the precomputations by adapting stored precomputation data according to changing road or traffic conditions scenarios.

17. The method of claim 16, further comprising configuring the host processor to adapt stored precomputation data dependent upon how many new ITS stations are observed at a rate and over a time-limited period.

18. The method of claim 13, wherein the message verification further includes 1) making a number (k) of bitwise comparisons of u1 and u2, and for each bit comparison (i), and 2) adding to a sum an $i^{th}$ entry of the first row of the associated table of entries ($P*2^{(i)}$) where the $i^{th}$ bit location of only u1 includes a "1, or adding to the sum an $i^{th}$ entry of the second row of the associated table of entries ($G*2^{(i)}$) where the $i^{th}$ bit location of only u2 includes a "1," or adding to the sum an $i^{th}$ entry of the third row of the associated table of entries (($P+G)*2^{(i)}$) where the $i^{th}$ bit location of both u1 and u2 include a "1."

* * * * *